US012706391B2

(12) United States Patent
Woo et al.

(10) Patent No.: US 12,706,391 B2
(45) Date of Patent: Aug. 11, 2026

(54) ELECTRONIC DEVICE COMPRISING ANTENNA MODULE

(71) Applicant: LG ELECTRONICS INC., Seoul (KR)

(72) Inventors: Seungmin Woo, Seoul (KR); Yusuhk Suh, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/141,723

(22) PCT Filed: Dec. 22, 2022

(86) PCT No.: PCT/KR2022/021094
§ 371 (c)(1),
(2) Date: Jun. 20, 2025

(87) PCT Pub. No.: WO2024/135890
PCT Pub. Date: Jun. 27, 2024

(65) Prior Publication Data
US 2026/0121300 A1 Apr. 30, 2026

(51) Int. Cl.
*H01Q 15/24* (2006.01)
*H01Q 1/22* (2006.01)
(Continued)

(52) U.S. Cl.
CPC ............... *H01Q 15/24* (2013.01); *H01Q 1/22* (2013.01); *H01Q 1/526* (2013.01); *H01Q 9/0414* (2013.01); *H01Q 21/06* (2013.01)

(58) Field of Classification Search
CPC .......... H01Q 15/24; H01Q 1/22; H01Q 1/526; H01Q 9/0414; H01Q 21/06
See application file for complete search history.

(56) References Cited

U.S. PATENT DOCUMENTS 10,693,215 B2 * 6/2020 Park ........................ H01Q 1/243
11,183,753 B2 * 11/2021 Hong ........................ H01Q 1/38
(Continued)

FOREIGN PATENT DOCUMENTS

KR 1020160034011 3/2016
KR 20220112037 A * 8/2022 ............. H01Q 1/243
(Continued)

OTHER PUBLICATIONS

PCT International Application No. PCT/KR2022/021094, International Search Report dated Sep. 18, 2023, 4 pages.

*Primary Examiner* — Regis J Betsch
*Assistant Examiner* — Jose A. Miranda Gonzalez
(74) *Attorney, Agent, or Firm* — LEE, HONG, DEGERMAN, KANG & WAIMEY

(57) ABSTRACT

This antenna module may comprise a multi-layer substrate composed of a plurality of dielectrics, and conductive patterns. The multi-layer substrate includes: a first layer made of a flexible first material; second layers, which are formed on one side surface of the first layer and are composed of a plurality of layers made of a stiff second material; and third layers, which are formed on the other side surface of the first layer and are composed of a plurality of layers made of the stiff second material. The conductive patterns includes: a first conductive pattern formed on the one side surface in first and second regions of the one side surface of the first layer; a second conductive pattern formed on a lower third layer; and a third conductive pattern formed on a lower fourth layer. The second and third conductive patterns can be connected through via holes.

20 Claims, 30 Drawing Sheets

(51) Int. Cl.

| | |
|---|---|
| ***H01Q 1/52*** | (2006.01) |
| ***H01Q 9/04*** | (2006.01) |
| ***H01Q 21/06*** | (2006.01) |

(56) References Cited

U.S. PATENT DOCUMENTS

| | | | | |
|---|---|---|---|---|
| 11,437,724 | B2 * | 9/2022 | Min | H01Q 1/523 |
| 2017/0214123 | A1 * | 7/2017 | Park | H01Q 5/335 |
| 2020/0176891 | A1 | 6/2020 | Chen et al. | |
| 2020/0411997 | A1 * | 12/2020 | Kim | H01Q 1/48 |
| 2021/0007213 | A1 * | 1/2021 | Ryu | H05K 1/028 |
| 2021/0168932 | A1 * | 6/2021 | Woo | H01Q 9/0457 |
| 2021/0376473 | A1 * | 12/2021 | Lee | H01Q 1/2283 |
| 2022/0336967 | A1 * | 10/2022 | Park | H01Q 25/001 |

FOREIGN PATENT DOCUMENTS

| | | |
|---|---|---|
| KR | 1020220112037 | 8/2022 |
| WO | 2019165193 | 8/2019 |
| WO | 2020262745 | 12/2020 |

* cited by examiner (a)

(b)

(a)

(b)

(a)

(a)

(b)

(a)

(b)

(a)

(b)

(a)

(b)

(a)

(b)

(a)

(b)

(a)

(b)

(c)

ELECTRONIC DEVICE COMPRISING ANTENNA MODULE

CROSS-REFERENCE TO RELATED APPLICATION(S)

This application is the National Stage filing under 35 U.S.C. 371 of International Application No. PCT/KR2022/021094, filed on Dec. 22, 2022, the contents of which are all incorporated by reference herein in its entirety.

TECHNICAL FIELD

The present disclosure relates to an antenna module and an electronic device including the same. A particular implementation relates to an antenna module implemented as a vertically polarized antenna, and an electronic device including the antenna module.

Background Art

As functions of electronic devices diversify, an image display device such as a multimedia player having composite functions such as playback of music or video files, games, broadcasting reception, etc. may be implemented.

The image display device is an apparatus that plays image content, and receives an image from various sources and plays the image back. The image display device is implemented as various devices such as a personal computer (PC), a smartphone, a tablet PC, a laptop computer, a TV, etc. The image display apparatus such as a smart TV, etc. may provide an application for providing web content such as a web browser, etc.

A communication module including an antenna may be provided so that the electronic device such as the image display device may perform communication with a peripheral electronic device. Meanwhile, recently, as a display area of an image display device is enlarged, an arrangement space of a communication module including an antenna is reduced. Accordingly, there is an increasing need to arrange an antenna in a multi-layer circuit substrate on which a communication module is implemented.

Meanwhile, a WiFi wireless interface may be taken into account, as an interface for a communication service between electronic devices. When such a WiFi wireless interface is used, a millimeter wave (mmWave) band may be used for high-speed data transmission between the electronic devices. In particular, high-speed data transmission between electronic devices may be performed using a wireless interface such as an 802.11ay wireless interface.

In relation to this, an array antenna capable of operating in a mmWave band may be mounted in an antenna module. However, electronic components such as an antenna and a transceiver circuit arranged in such an antenna module are configured to be electrically connected to each other. To do so, the transceiver circuit may be operably coupled to the antenna module, and the antenna module may be configured as a multi-layer substrate.

As the multi-layer substrate of the antenna module is arranged to have a planar stacked structure, a constraint may occur when a vertically polarized antenna is implemented. In this regard, a length of the vertically polarized antenna may be configured to be greater than a height of the multi-layer substrate. Due to the constraint in the height of the multi-layer substrate, there is a problem in that antenna performance may deteriorate when the vertically polarized antenna is configured to have a small length.

In addition, when a dual-polarized antenna for a horizontally polarized antenna and a vertically polarized antenna is implemented, a combination structure between PCBs of different multi-layer substrates may be configured. In the combination structure between the PCBs of these different multi-layer substrates, lengths from respective feeding lines to the vertically polarized antenna and the horizontally polarized antenna may be configured to be different from each other. Accordingly, performance differences between the vertically polarized antenna and the horizontally polarized antenna may occur, or a feed loss may increase in a mmWave band due to an increase in lengths of the feeding lines. Therefore, there is a problem such that an antenna gain of an antenna module having the combination structure between PCBs of different multi-layer substrates may be worsened.

DISCLOSURE OF INVENTION

Technical Problem

One object of this specification is to solve the aforementioned problems and other drawbacks. Another object of this specification is to provide an antenna module in which a vertically polarized antenna operating in a millimeter wave band is implemented, and an electronic device including the antenna module.

Another object of this specification is to implement an antenna that performs radiation from one side of a printed circuit board (PCB) using a flexible printed circuit board (FPCB).

Another object of this specification is to provide a vertically polarized antenna through an asymmetric dipole antenna arranged on an FPCB and a PCB.

Another object of this specification is to arrange an FPCB to be vertical to a PCB to implement vertical polarization even at a height of the PCB which is insufficient to implement the vertical polarization.

Another object of this specification is to implement one pole on an FPCB and another pole on a PCB as radiators to improve performance of vertical polarization, thereby increasing an area to enhance radiation performance.

Another object of this specification is to perform wireless communication with a peripheral electronic device by optimally arranging an antenna module on a lower portion of an electronic device

Solution to Problem

To achieve these and other advantages and in accordance with the purpose of an embodiment, as embodied and broadly described herein, there is provided an antenna module including a multi-layer substrate made of a plurality of dielectrics and a conductive pattern. The multi-layer substrate may include: a first layer made of a flexible first material; second layers including a plurality of layers made of a stiff (rigid) second material arranged on one side surface of the first layer; and third layers including a plurality of layers made of the rigid second material arranged on another side surface of the first layer. The conductive pattern may include: a first conductive pattern arranged on the one side surface in the first region and the second region of the one side surface of the first layer to transmit and receive a signal; a second conductive pattern arranged on a lower third layer which is one layer of the third layers; and a third conductive pattern arranged on a lower fourth layer which is another layer among the third layers. The second conductive pattern and the third conductive pattern may be connected to each other through via holes.

According to an embodiment, the first layer may include a first region arranged in parallel with the second layers and the third layers, and a second region arranged to be vertical to the second layers and the third layers.

According to an embodiment, the second conductive pattern and the third conductive pattern may be connected to each other through via holes. The lower third layer may be arranged close to the another side surface of the first layer, and the lower fourth layer may be arranged further apart from the another side surface of the first layer compared to the lower third layer.

According to an embodiment, a space in the first conductive pattern arranged in the first region may be configured to be narrower than a space in the second conductive pattern connected to ground of the multi-layer substrate.

According to an embodiment, the second conductive pattern may include a first sub-pattern connected to one region of the ground of the multi-layer substrate and a second sub-pattern connected to the via holes. A space in the first sub-pattern, which is a part of the second conductive pattern, may be configured to be narrower than a space in the second sub-pattern arranged in the lower fourth layer among the third layers.

According to an embodiment, one end region of the third conductive pattern is configured to be electrically connected to the second sub-pattern through a plurality of rows of a plurality of the via holes.

According to an embodiment, a first height of the first conductive pattern is configured to be within a predetermined range with reference to 1 mm. A second height of a via structure between the third conductive pattern and the second conductive pattern each connected to the via structure constituted by the via holes is configured to be within a predetermined range with reference to 0.3 mm.

According to an embodiment, the first height of the first conductive pattern may be configured to be greater than the second height of the via structure by a predetermined height or more. A difference between the first height and the second height may be configured to be within a predetermined range with reference to $0.14\lambda_0$ at 60 GHz.

According to an embodiment, a third width of the third sub-pattern may be configured to be within a range between 0.2 mm and 1.0 mm.

According to an embodiment, the third conductive pattern may be configured to have the third width in the first axial direction and a third length in a second axial direction vertical to the first axial direction. The third width of the third conductive pattern may be configured to be identical to the second width of the second sub-pattern. The third conductive pattern may be configured to have the third length from one side end portion to another side end portion.

According to an embodiment, the third conductive pattern may be connected to the second sub-pattern through the via holes at a point adjacent to the one side end portion of the third conductive pattern. The another side end portion of the third conductive pattern may be located to a point adjacent to an end portion of a ground wall configured as a multilayer structure in an inner region of the printed circuit board (PCB).

According to an embodiment, the antenna module may further include at least one conductive pad arranged between the second sub-pattern and the third conductive pattern. The via holes arranged in the first axial direction may be configured to be arranged vertically in a third axial direction to connect the second sub-pattern to the at least one conductive pad, and arranged vertically in the third axial direction to connect the at least one conductive pad to the third conductive pattern.

According to an embodiment, the second conductive pattern may further include a third sub-pattern arranged at an end portion of the second sub-pattern to have a fourth width in the first axial direction and a fourth length in the second axial direction. The second sub-pattern may constitute a first ground pad connected to a plurality of via holes in the first axial direction. The third sub-pattern may constitute a second ground pad extending from an end portion of the first ground pad. A signal transmitted through the feeding line may be transmitted to the first conductive pattern by the second ground pad extending from the first ground pad.

According to an embodiment, the one side end portion of the PCB is arranged to be spaced apart from a flexible substrate made of the flexible material by a gap having a predetermined width. The width of the gap may be configured to be 0.3 mm or less.

According to an embodiment, the first conductive pattern, the second conductive pattern, the via structure, and the third conductive pattern operate as antenna elements having horizontal polarization in a millimeter wave band. The antenna elements may be arranged in plurality in the first axial direction to constitute an array antenna. A first antenna element to a fourth antenna element of the array antenna may be configured to radiate a beamformed radio signal in the first axial direction.

According to an embodiment, the antenna module may further include a shield can arranged on a ground pattern in an upper portion of the ground wall of the PCB. A distance d from the shield can to the flexible substrate is configured to be in a range of $(0.17+n)*\lambda_0<d<(0.33+n)*\lambda_0$.

An electronic device having an antenna module according to another aspect of this specification may include: a metal frame constituting a side region of the electronic device; a dielectric case arranged on one side of the metal frame; and an antenna module arranged in an inner region of the dielectric case and arranged to face an inner surface of the dielectric case. The antenna module may include a multi-layer substrate made of a plurality of dielectric materials and a conductive pattern. The multi-layer substrate includes a first layer made of a flexible first material; second layers including a plurality of layers made of a stiff (rigid) second material arranged on one side surface of the first layer; and third layers including a plurality of layers made of the rigid second material arranged on another side surface of the first layer. The conductive pattern includes: a first conductive pattern arranged on the one side surface in the first region and the second region of the one side surface of the first layer to transmit and receive a signal; a second conductive pattern arranged on a lower third layer which is one layer of the third layers; and a third conductive pattern arranged on a lower fourth layer which is another layer among the third layers.

According to an embodiment, the first layer may include a first region arranged in parallel with the second layers and the third layers, and a second region arranged to be vertical to the second layers and the third layers.

According to an embodiment, the second conductive pattern and the third conductive pattern may be connected to each other through via holes. The lower third layer may be arranged close to the another side surface of the first layer, and the lower fourth layer may be arranged further apart from the another side surface of the first layer compared to the lower third layer.

According to an embodiment, a space in the first conductive pattern arranged in the first region may be configured to be narrower than a space in the second conductive pattern connected to ground of the multi-layer substrate.

According to an embodiment, the second conductive pattern includes a first sub-pattern connected to one region of the ground of the multi-layer substrate and a second sub-pattern connected to the via holes. A space in the first sub-pattern, which is a part of the second conductive pattern, may be configured to be narrower than a space in the second sub-pattern arranged in the lower fourth layer among the third layers.

According to an embodiment, one end region of the third conductive pattern may be configured to be configured to be electrically connected to the second sub-pattern through a plurality of rows of a plurality of the via holes.

Advantageous Effects of Invention

Hereinafter, technical effects of an antenna module implemented as a vertically polarized antenna according to this specification and an electronic device including the antenna module are described.

According to an embodiment, an antenna module in which a vertically polarized antenna operating in a millimeter wave band is implemented, and an electronic device including the antenna module may be provided.

According to an embodiment, an antenna may be implemented on one side of a PCB to perform radiation through a conductive pattern of an FPCB and a via structure and a conductive pattern implemented on one side of the PCB.

According to an embodiment, a vertically polarized antenna may be provided through an asymmetrical dipole antenna constituted by an upper-end pole and a lower-end pole arranged on an FPCB and a PCB, respectively.

According to an embodiment, vertical polarization may be implemented even at a height of a PCB which is insufficient to implement the vertical polarization by arranging an FPCB vertically to the PCB and through a conductive pattern of the FPCB and a conductive pattern and a vertical via of the PCB.

According to an embodiment, radiation performance may be enhanced by increasing an area by implementing one pole on an FPCB and another pole on a PCB as radiators to thereby improve performance of vertical polarization.

According to an embodiment, wireless communication may be performed with a peripheral electronic device by optimally arranging an antenna module on a lower portion of an electronic device.

Further scope of applicability of this specification will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1:
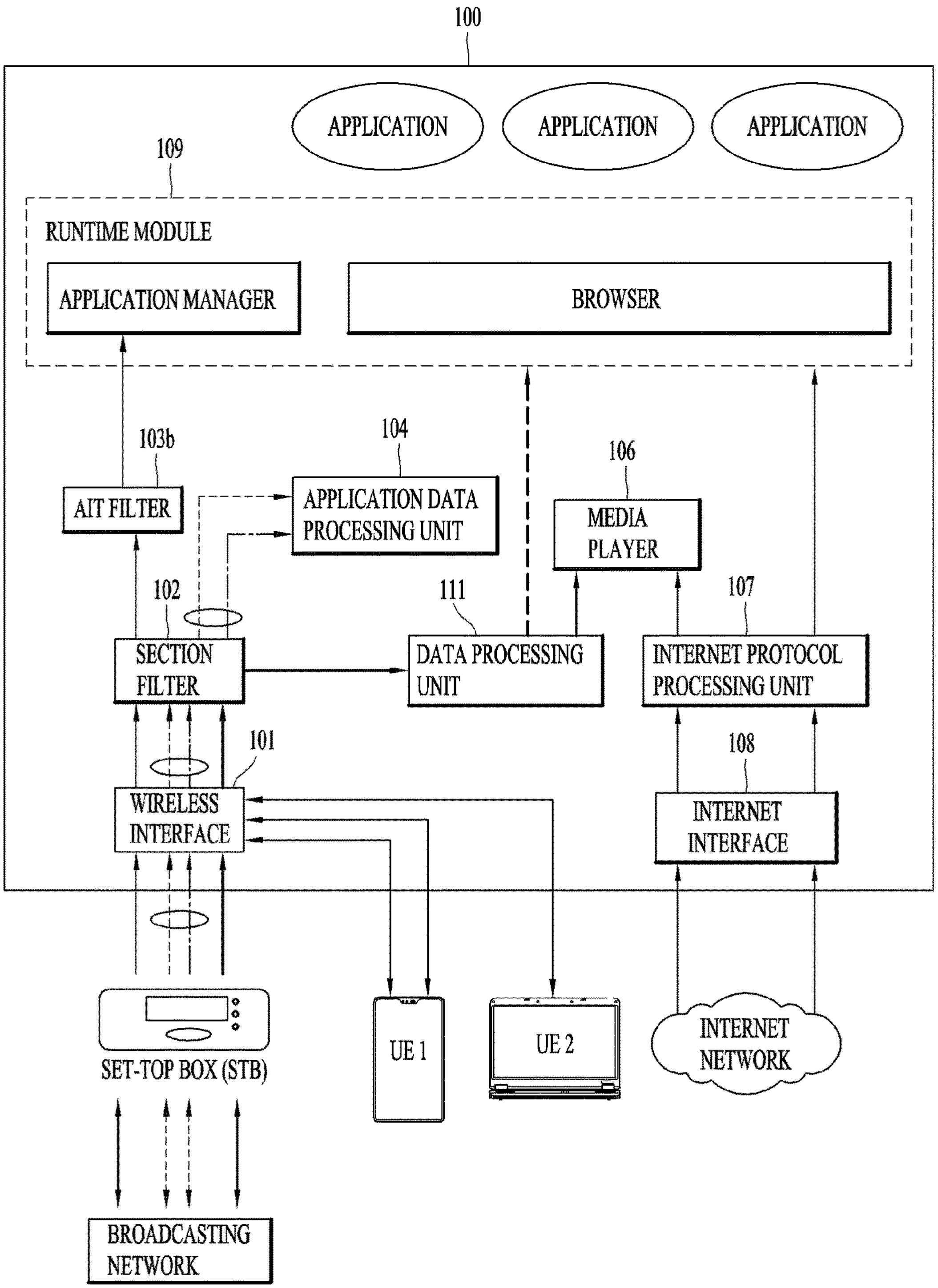
FIG. 1 is a diagram schematically illustrating an example of a whole wireless audio-video (AV) system including an image display device according to one embodiment of this specification.

Hereinafter, embodiments disclosed herein will be described in detail with reference to the accompanying drawings, and the same or similar elements are designated with the same numeral references, regardless of the numerals in the drawings, and their redundant description will be omitted. Suffixes "module" and "unit" used for components used in the following description are merely intended for easy description of this specification, and each suffix itself is not intended to give any special meaning or function. In describing the embodiments disclosed herein, moreover, the detailed description will be omitted when specific description for publicly known technologies to which the disclosure pertains is judged to obscure the gist of this specification. The accompanying drawings are used to help easily understand the technical idea of this specification and it should be understood that the idea of this specification is not limited by the accompanying drawings. The idea of this specification should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected" or "coupled" to another element, the element may be directly connected or coupled to the another element, or intervening elements may also be present. In contrast, when an element is referred to as being "directly connected with" another element, there are no intervening elements present.

A singular representation may include a plural representation unless it represents a definitely different meaning from the context.

Terms such as "include" or "has" as used herein should be understood that they are intended to indicate the existence of a feature, a number, a step, an element, a component, or a combination thereof disclosed in this specification, and it may also be understood that a possibility of presence or addition of one or more other features, numbers, steps, elements, components, or combinations thereof are not excluded in advance.

An electronic device described herein may include a mobile phone, a smartphone, a laptop computer, a digital broadcasting terminal, a personal digital assistant (PDA), a portable multimedia player (PMP), a navigation system, a slate personal computer (PC), a tablet PC, an ultrabook, a wearable device, (e.g., a smartwatch, smart glasses, a head mounted display (HMD)), or the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

FIG. 1 is a diagram schematically illustrating an example of a whole wireless audio-video (AV) system including an image display device according to one embodiment of this specification.

As illustrated in FIG. 1, an image display device 100 according to another embodiment of the present disclosure is connected to the wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface. In relation to this, the image display device 100 may be configured to be connected to a server or another electronic device via a wireless communication system. As an example, the image display device 100 needs to provide an 802.111ay communication service operating in a millimeter wave (mmWave) band to transmit or receive large-capacity data at a high speed.

The mmWave band may be any frequency band in a range of 10 GHz to 300 GHz. In this disclosure, the mmWave band may include an 802.11ay band of a 60 GHz band. In addition, the mmWave band may include a 5G frequency band of a 28 GHz band or the 802.11ay band of the 60 GHz band. The 5G frequency band may be set to about 24 to 43 GHz band and the 802.11ay band may be set to 57 to 70 GHz or 57 to 63 GHz band, but are not limited thereto.

Meanwhile, the image display device 100 may wirelessly transmit or receive data to/from an electronic device in a periphery of the image display device 100, e.g., a set-top box or another electronic device via the wireless interface. As an example, the image display device 100 may transmit or receive wireless AV data to/from a set-top box or another electronic device, e.g., a mobile terminal arranged in front of or below the image display device.

The image display device 100 includes, for example, a wireless interface 101*b*, a section filter 102*b*, an application information table (AIT) filter 103*b*, an application data processing unit 104*b*, a data processing unit 111*b*, a media player 106*b*, an Internet protocol processing unit 107*b*, an Internet interface 108*b*, and a runtime module 109*b*.

Through the broadcast interface 101*b*, application information table (AIT) data, real-time broadcast content, application data, and a stream event are received. Meanwhile, the real-time broadcast content may be referred to as linear audio/video (A/V) content.

The section filter 102*b* performs section filtering on four types of data received through the wireless interface 101*b* to transmit the AIT data to the AIT filter 103*b*, the linear A/V content to the data processing unit 111*b*, and the stream events and the application data to the application data processing unit 104*b*.

Meanwhile, the non-linear A/V content and the application data are received through the Internet interface 108*b*. The non-linear A/V content may be, for example, a content on demand (COD) application. The non-linear A/V content is transmitted to the media player 106*b*, and the application data is transmitted to the runtime module 109*b*.

Further, the runtime module 109*b* includes, for example, an application manager and a browser as illustrated in FIG. 1. The application manager controls a life cycle of an interactive application using, for example, the AIT data. In addition, the browser performs, for example, a function of displaying and processing the interactive application.

Hereinafter, a communication module having an antenna for providing a wireless interface in an electronic device such as the above-described image display device is described in detail. In relation to this, the wireless interface for communication between electronic devices may be a WiFi wireless interface, but is not limited thereto. As an example, a wireless interface supporting an 802.11ay standard may be provided for high-speed data transmission between electronic devices.

The 802.11ay standard is a subsequent standard for increasing a throughput of an 802.11ad standard to 20 Gbps or greater. An electronic device supporting the 802.11ay wireless interface may be configured to use a frequency band of about 57 to 64 GHz. The 802.11ay wireless interface may be configured to provide backward compatibility for an 802.11ad wireless interface. Meanwhile, the electronic device providing the 802.11ay wireless interface may be configured to provide coexistence with a legacy device using the same band.

In relation to a wireless environment for the 802.11ay standard, a configuration may be such that a coverage of 10 meters or longer is provided in an indoor environment, and a coverage of 100 meters or longer is provided in an outdoor environment with a line of sight (LOS) channel condition.

The electronic device supporting the 802.11ay wireless interface may be configured to provide visual reality (VR) headset connectivity, support server backups, and support cloud applications that need low latency.

An ultra short range (USR) communication scenario, i.e., a near field communication scenario which is a use case of the 802.11ay wireless interface is a model for fast large-capacity data exchange between two terminals. The USR communication scenario may be configured to require low power consumption of less than 400 mW, while providing a fast link setup within 100 msec, transaction time within 1 second, and a 10 Gbps data rate at a very close distance of less than 10 cm.

As the use case of the 802.11ay wireless interface, an 8K UHD wireless transfer at smart home usage model may be taken into account. In the smart home usage model, a wireless interface between a source device and a sync device may be taken into consideration to stream 8K UHD content at home. In relation to this, the source device may be one of a set-top box, a Blue-ray player, a tablet PC, and a smart phone and the sink device may be one of a smart TV and a display device, but are not limited thereto. In relation to this, the wireless interface may be configured to transmit uncompressed 8K UHD streaming data (60 fps, 24 bits per pixel, at least 4:2:2) with a coverage of less than 5 m between the source device and the sink device. To do so, the wireless interface may be configured such that data is transmitted between electronic devices at a speed of at least 28 Gbps.

In order to provide such a wireless interface, embodiments related to an array antenna operating in a mmWave band and an electronic device including the array antenna is described with reference to the accompanying drawings. It will be apparent to those skilled in the art that this specification may be embodied in other specific forms without departing from the spirit or essential characteristics thereof.

Figure 2:
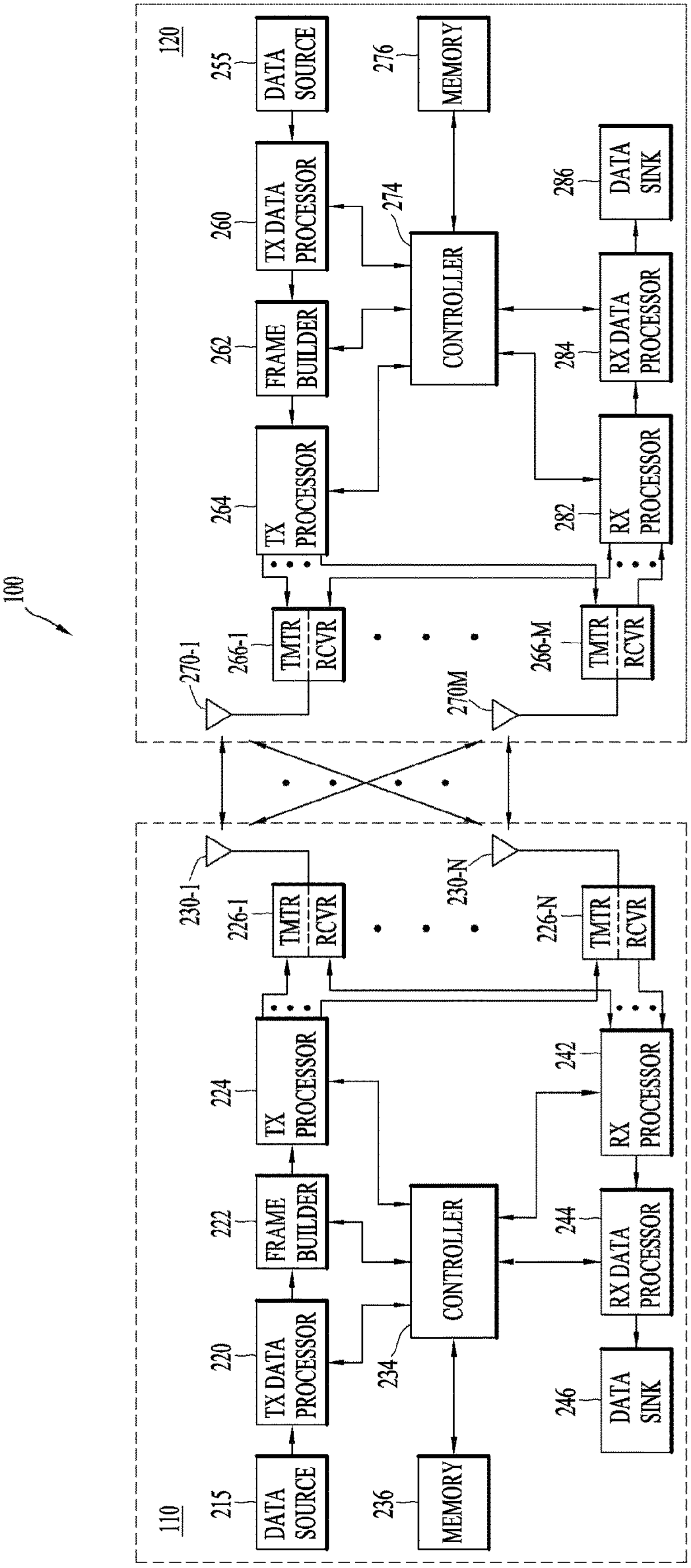
FIG. 2 illustrates a detailed configuration of electronic devices that support a wireless interface according to this specification.

FIG. 2 illustrates a detailed configuration of electronic devices that support a wireless interface according to this specification. FIG. 2 illustrates a block diagram of an access point 110 (generally, a first wireless node) and an access terminal 120 (generally, a second wireless node) in a wireless communication system. The access point 110 is a transmitting entity for downlink transmission and a receiving entity for uplink transmission. The access terminal 120 is a transmitting entity for uplink transmission and a receiving entity for downlink transmission. As used herein, the "transmitting entity" is an independently operating apparatus or device capable of transmitting data through a wireless channel, and the "receiving entity" is an independently operating apparatus or device capable of receiving data through a wireless channel.

Referring to FIGS. 1 and 2, a set-top box STB of FIG. 1 may be the access point 110, and an electronic device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 includes a transmission data processor 220, a frame builder 222, a transmission processor 224, a plurality of transceivers 226-1 to 226-N, and a plurality of antennas 230-1 to 230-N. The access point 110 also includes a controller 234 configured to control operations of the access point 110.

To transmit data, the access point 110 includes a transmission data processor 220, a frame builder 222, a transmission processor 224, a plurality of transceivers 226-1 to 226-N, and a plurality of antennas 230-1 to 230-N. The access point 110 also includes a controller 234 configured to control operations of the access point 110.

During operation, the transmission data processor 220 receives data (e.g., data bits) from a data source 215, and processes the data for transmission. For example, the transmission data processor 220 may encode data (e.g., data bits) into encoded data, and modulate the encoded data into data symbols. The transmission data processor 220 may support different modulation and coding schemes (MCSs). For example, the transmission data processor 220 may the encode data at any one of a plurality of different coding rates (e.g., using low-density parity check (LDPC) encoding). In addition, the transmission data processor 220 may modulate the encoded data using any one of a plurality of different modulation schemes including, but not limited to, BPSK, QPSK, 16 QAM, 64 QAM, 64 APSK, 128 APSK, 256 QAM, and 256 APSK.

The controller 234 may transmit, to the transmission data processor 220, a command for specifying an MCS to be used (e.g., based on channel conditions for downlink transmission). The transmission data processor 220 may encode and modulate the data received from the data source 215 according to the specified MCS. It needs to be recognized that the transmission data processor 220 may perform additional processing on the data, such as data scrambling and/or other processing. The transmission data processor 220 outputs the data symbols to the frame builder 222.

The frame builder 222 builds a frame (also referred to as a packet) and inserts the data symbols into a data payload of the frame. The frame may include a preamble, a header, and a data payload The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the transmission processor 224.

The transmission processor 224 processes the frame for transmission on downlink. For example, the transmission processor 224 may support different transmission modes, e.g., an orthogonal frequency-division multiplexing (OFDM) transmission mode and a single-carrier (SC) transmission mode. In this example, the controller 234 may transmit, to the transmission processor 224, a command for specifying a transmission mode to be used, and the transmission processor 224 may process the frame for transmission according to the specified transmission mode. The transmission processor 224 may apply a spectrum mask to the frame so that a frequency configuration of a downlink signal complies with particular spectrum requirements.

The transmission processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The transmission processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a transmission data processor 260, a frame builder 262, a transmission processor 264, a plurality of transceivers 266-1 to 266-M, and a plurality of antennas 270-1 to 270-M (e.g., one antenna per transceiver). The access terminal 120 may transmit data to the access point 110 on uplink and/or transmit the data to another access terminal (e.g., for peer-to-peer communication). The access terminal 120 also includes a controller 274 for controlling operations of the access terminal 120

The transceivers 266-1 to 266-M receive and process (e.g., convert to analog, amplify, filter, and frequency up-convert) an output from the transmission processor 264 for transmission via one or more of the antennas 270-1 to 270-M. For example, the transceiver 266 may up-convert the output from the transmission processor 264 into a transmission signal having a frequency in a 60 GHz band. Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layer circuit substrate. To do so, among the antennas 270-1 to 270-M, an antenna that operates with vertical polarization may be vertically arranged inside the multi-layer circuit substrate.

To receive data, the access point 110 includes a reception (RX) processor 242 and an RX data processor 244. During operation, the transceivers 226-1 to 226-N receive a signal (e.g., from the access terminal 120) and spatially process (e.g., frequency down-convert, amplify, filter, and digitally convert) the received signal.

The reception processor 242 receives outputs from the transceivers 226-1 through 226-N and processes the outputs to recover data symbols. For example, the access point 110 may receive data from a frame (e.g., from the access terminal 120). In this example, the reception processor 242 may detect a start of the frame using the short training field (STF) sequence in a preamble of the frame. The reception processor 242 may also use the STF for automatic gain control (AGC) adjustment. The reception processor 242 may also perform channel estimation (e.g., using a channel estimation (CE) sequence in the preamble of the frame), and perform channel equalization on the received signal based on the channel estimation.

The reception data processor 244 receives the data symbols from the reception processor 242 and an indication of a corresponding MSC scheme from the controller 234. The reception data processor 244 demodulates and decodes the data symbols, recovers the data according to the indicated MSC scheme, and stores and/or outputs the recovered data (e.g., data bits) to a data sink 246 for additional processing.

The access terminal 120 may transmit the data using an orthogonal frequency-division multiplexing (OFDM) transmission mode or a single-carrier (SC) transmission mode. In this case, the reception processor 242 may process the received signal according to a selected transmission mode. In addition, as described above, the transmission processor 264 may support MIMO transmission. In this case, the access point 110 includes the plurality of antennas 230-1 to 230-N and the plurality of transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on a multi-layer circuit substrate. To do so, among the antennas 230-1 to 230-M, an antenna that operates with vertical polarization may be vertically arranged inside the multi-layer circuit substrate.

Meanwhile, each transceiver receives and processes (e.g., frequency down-converts, amplifies, filters, and digitally converts) a signal from each antenna. The reception processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
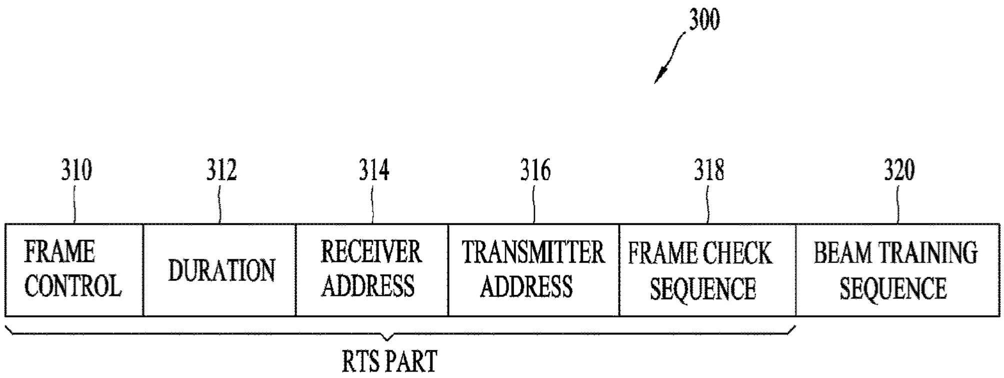
FIG. 3A illustrates a request-to-send frame (RTS) and a clear-to-send (CTS) frame according to this specification.
Figure 3A:
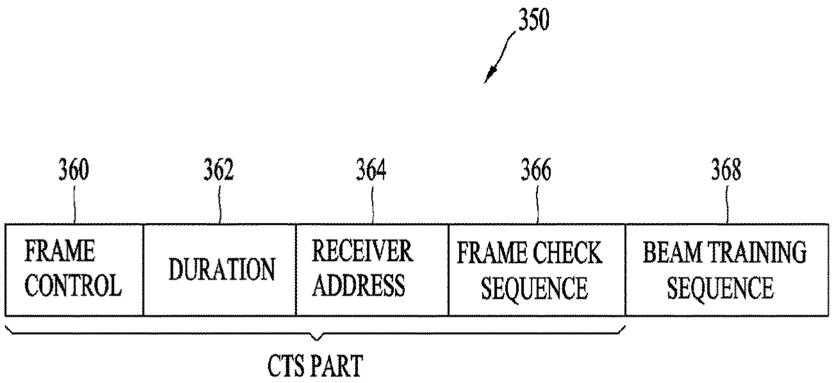

Meanwhile, an electronic device supporting the 802.11ay wireless interface described herein determines whether a communication medium may be used to communicate with another electronic device. To do so, the electronic device transmits a request-to-send (RTS)-TRN frame including an RTS part and a first beam training sequence. In relation to this, FIG. 3A illustrates a request-to-send frame (RTS) and a clear-to-send (CTS) frame according to this specification. In relation to this, a transmission device may use the RTA frame to determine whether a communication medium may be used to transmit one or more data frames to a destination device. In a response to receiving the RTS frame, the destination device transmits the CTS frame back to the transmission device when the communication medium may be used. In a response to receiving the CTS frame, the transmission device transmits one or more data frames to the destination device. In a response to successfully receiving the one or more data frames, the destination device transmits one or more acknowledgment ("ACK") frames to the transmission device.

Referring to (a) of FIG. 3A, a frame 300 includes the RTS part including a frame control field 310, a duration field 312, a receiver address field 314, a transmitter address field 316, and a frame check sequence field 318. To improve communication and reduce interference, the frame 300 further includes a beam training sequence field 320 for configuring respective antennas of the destination device and one or more neighboring devices.

Referring to (b) of FIG. 3A, a CTS frame 350 includes a CTS part containing a frame control field 360, a duration field 362, a receiver address field 364, and a frame check sequence field 366. To improve communication and reduce interference, the frame 350 further includes a beam training sequence field 368 for configuring respective antennas of the transmission device and one or more neighboring devices.

The beam training sequence fields 320 and 368 may conform to a training (TRN) sequence according to the IEEE 802.11ad or 802.11ay standard. The transmission device may use the beam training sequence field 368 to configure an antenna of the transmission device for directional transmission to the destination device. Meanwhile, transmission devices may use the beam training sequence field to configure respective antennas of the transmission devices to prevent transmission interference at the destination device. In this case, the beam training sequence field may be used to configure the respective antennas of the transmission devices to generate an antenna radiation pattern with nulls targeting the destination device.

Figure 3B:
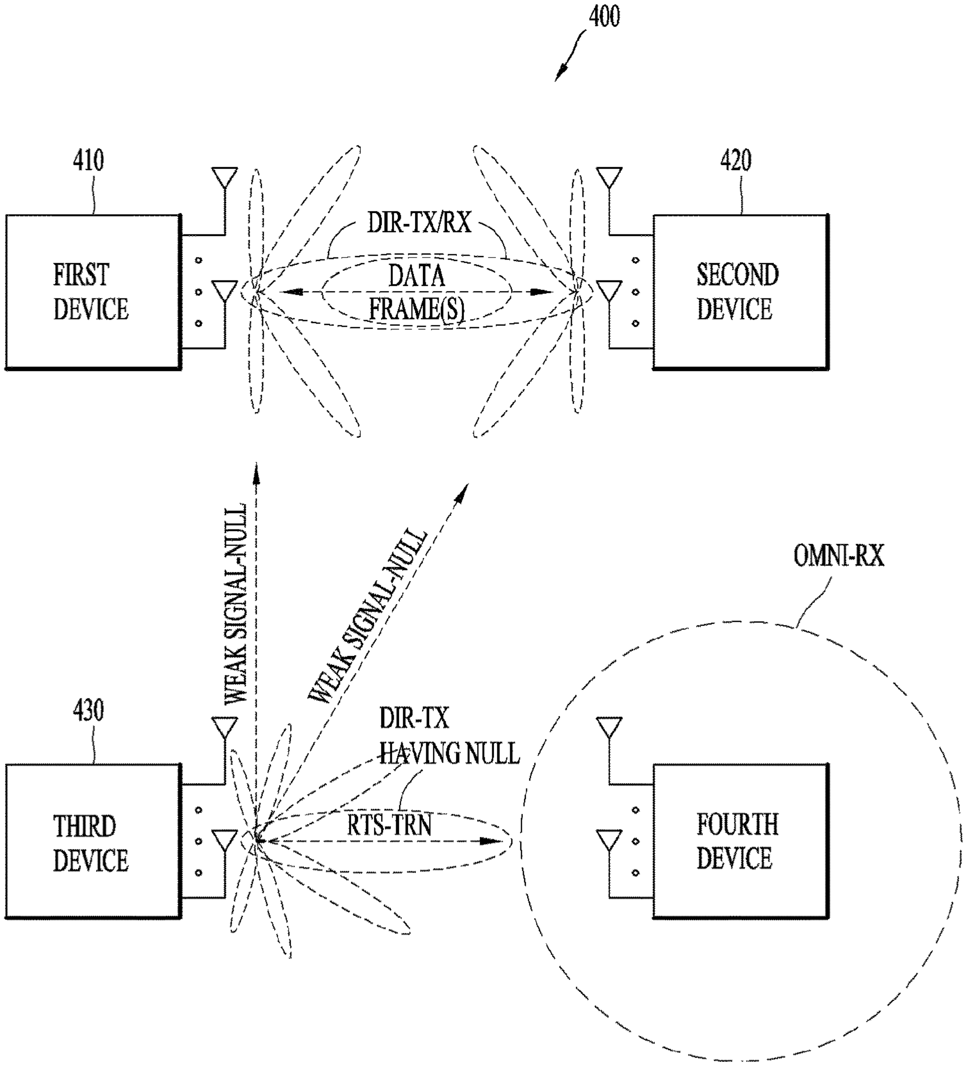
FIG. 3B illustrates a block diagram of a communication system 400 according to an example of this specification.

Accordingly, electronic devices supporting the 802.11ay wireless interface may generate an initial beam to have a low interference level with each other, using a beamforming pattern determined according to a beam training sequence. In relation to this, FIG. 3B illustrates a block diagram of a communication system 400 according to an example of this specification. As illustrated in FIG. 3B, first and second devices 410 and 420 may improve communication performance by matching directions of main beams with each other. To reduce interference with a third device 430, the first and second devices 410 and 420 may create a signal-null having a weak signal strength in a particular direction.

In relation to the generation of the main beams and the signal-null, a plurality of electronic devices described herein may be configured to perform beamforming through an array antenna. Referring to FIG. 3B, some of the electronic devices may be configured to communicate with an array antenna of another electronic device through a single antenna. In relation to this, when communication is performed through a single antenna, a beam pattern is generated as an omnidirectional pattern.

Referring to FIG. 3B, it is shown that the first to third devices 410 to 430 perform beamforming and a fourth device 440 does not perform beamforming. However, performance of beamforming is not limited thereto. Accordingly, three of the first to fourth devices 410 may be configured to perform beamforming, and the other may be configured not to perform beamforming.

As another example, only one of the first to fourth devices 410 may be configured to perform beamforming, and the other three devices may be configured not to perform beamforming. As another example, two of the first to fourth devices 410 may be configured to perform beamforming but the other two may be configured not to perform beamforming. As another example, all of the first to fourth devices 410 may be configured to perform beamforming.

Referring to FIGS. 3A and 3B, the first device 410 determines that the first device 410 is an intended receiving device for the CTS-TRN frame 350, based on an address indicated in the receiver address field 364 of the CTS-TRN frame 350. In response to the determining as being the intended receiving device for the CTS-TRN frame 350, the first device 410 may selectively use a beam training sequence in the beam training sequence field 368 of the received CTS-TRN frame 350 to configure an antenna of the first device 410 for directional transmission substantially targeting the second device 420. That is, the antenna of the first device 410 is configured to generate an antenna radiation pattern having a primary lobe (e.g., a highest gain lobe) substantially targeting the second device 420 and non-primary lobes targeting other directions.

The second device 420 is already aware of a direction toward the first device 410 on a basis of the beam training sequence of the beam training sequence field 320 in an RTS-TRN frame 300 previously received by the second device 420. Thus, the second device 420 may configure an antenna of the second device 420 selectively for directional reception targeting the first device 410 (e.g., a primary antenna radiation lobe). Therefore, while the antenna of the first device 410 is configured for the directional transmission to the second device 420 and the antenna of the second device 420 is configured for the directional reception from the first device 410, the first device 410 transmits one or more data frames to the second device 420. Accordingly, the first and second devices 410 and 420 perform directional transmission/reception DIR-TX/RX of one or more data frames through the primary lobe (the main beam).

Meanwhile, the first and second devices 410 and 420 may partially modify a beam pattern of the third device 430 to reduce interference with the third device 430 due to the antenna radiation pattern having the non-primary lobes.

In relation to this, the third device 430 determines that the third device 430 is not the intended receiving device for the CTS-TRN frame 350 on a basis of an address indicated in the receiver address field 364 of the CTS-TRN frame 350. In a response to the determining that the third device 430 is not the intended receiving device for the CTS-TRN frame 350, the third device 430 uses the beam training sequence in the beam training sequence field 368 of the received CTS-TRN 350 and a sequence of the beam training sequence field 320 in the RTS-TRN frame 300 previously received, to configure the antenna of the third device 430 to generate antenna radiation patterns having nulls substantially targeting the second device 420 and the first device 410, respectively. The nulls may be based on estimated angles of arrivals of the RTS-TRN frame 300 previously received, and the CTS-TRN frame 350. In general, the third device 430 generates antenna radiation patterns having desired signal powers, rejections or gains targeting the first device 410 and the second device 420, respectively (for example, to achieve an estimated interference in the first and second devices 410 and 420 to be equal to or less than a defined threshold value (e.g., to acquire desired BER, SNR, SINR and/or other one or more communication properties)).

The third device 430 may configure an antenna transmission radiation pattern of the third device 430 by estimating antenna gains in directions toward the first and second devices 410 and 420, estimating antenna reciprocity differences between the third device 430 and the first and second devices 410 and 420 (e.g., a transmission antenna gain minus a reception antenna gain), and respectively calculating the antenna gains and the antenna reciprocity differences throughout one or more sectors to determine estimated interferences corresponding to the first and second devices 410 and 420.

The third device 430 transmits the RTS-TRN frame 300 intended for the fourth device 440 and to be received by the fourth device 440. As long as the first and second devices 410 and 420 perform communication on a basis of durations indicated in duration fields of the duration fields 312 and 362 of the RTS-TRN frame 300 and the CTS-TRN frame 350, respectively, the third device 430 maintains an antenna configuration having nulls targeting such devices. Since the antenna of the third device 430 is configured to generate nulls targeting the first device 410 and the second device 420, transmission of the RTS-TRN frame 300 by the third device 430 may generate reduced interference in the first device 410 and the second device 420, respectively.

Accordingly, electronic devices supporting the 802.11ay wireless interface disclosed herein may configure a signal null direction in a particular direction to reduce interference while matching main beam directions with each other using an array antenna. To do so, a plurality of the electronic devices may configure an initial beam direction through a beam training sequence and change a beam direction through a periodically updated beam training sequence.

As described above, for high-speed data communication between the electronic devices, beam directions should be configured to match each other. In addition, a loss of a wireless signal transmitted to an antenna element needs to be minimized for high-speed data communication. To do so, an array antenna needs to be arranged in a multi-layer substrate on which a radio frequency integrated chip (RFIC) is arranged. In addition, for radiation efficiency, the array antenna needs to be arranged adjacent to a side surface region in the multi-layer substrate.

In addition, in order to adapt to a change in a wireless environment, a beam training sequence between the electronic devices needs to be updated. To update the beam training sequence, the RFIC needs to periodically transceive signals with a processor such as a modem. Therefore, to minimize update delay time, transception of a control signal between the RFIC and the modem needs to be performed within short time. To do so, a physical length of a connection path between the RFIC and the modem needs to be reduced. To do so, the modem may be arranged on a multi-layer substrate on which the array antenna and the RFIC are arranged. Alternatively, a connection length between the RFIC and the modem may be configured to be minimized in a structure in which the array antenna and the RFIC are arranged on the multi-layer substrate and the modem is arranged on a main substrate. In relation to this, a detailed structure will be described with reference to FIG. 5C.

Figure 4:
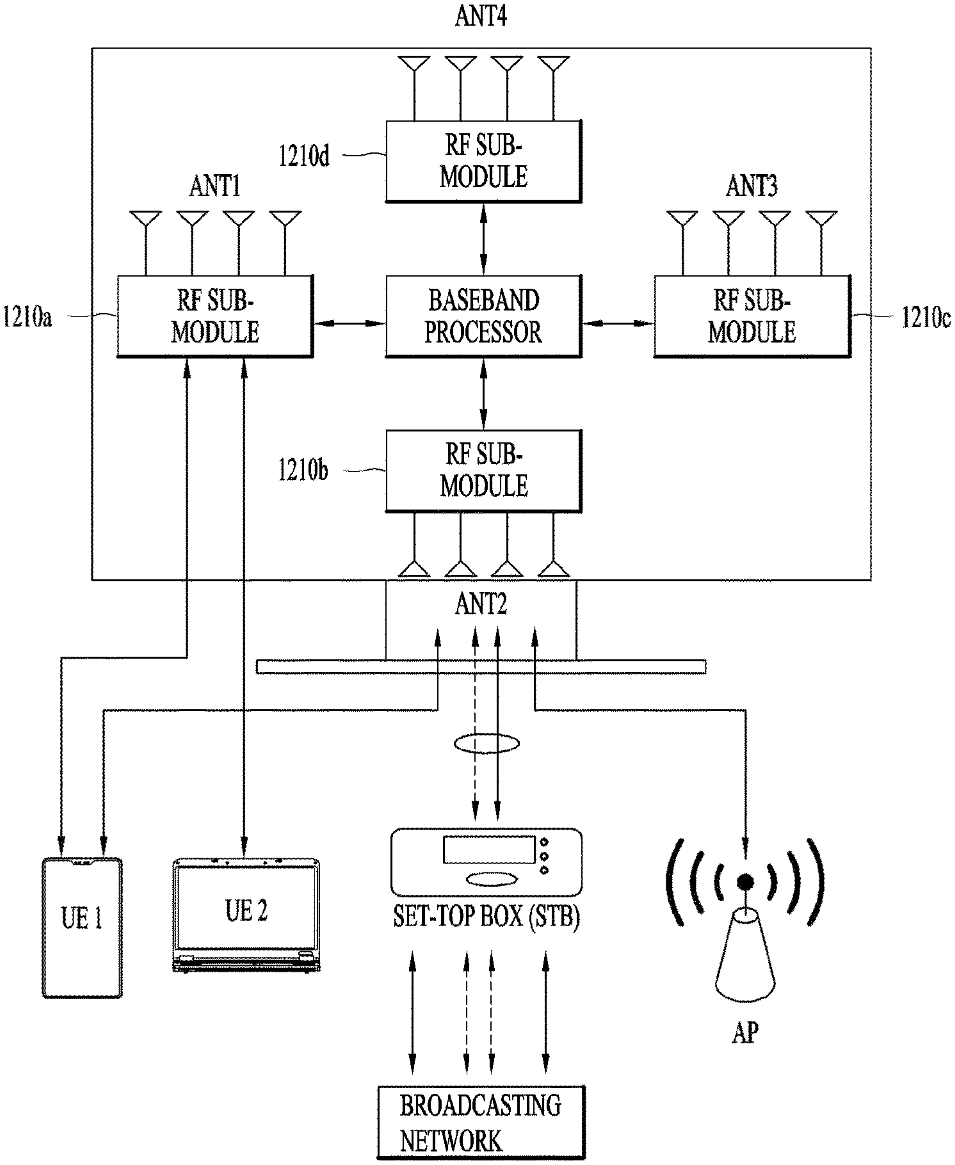
FIG. 4 illustrates an electronic device in which a plurality of antenna modules and a plurality of transceiver circuit modules are arranged, according to an embodiment.

Hereinafter, an electronic device having an array antenna that may operate in a mmWave band according to this specification will be described. In relation to this, FIG. 4 illustrates an electronic device in which a plurality of antenna modules and a plurality of transceiver circuit modules according to one embodiment are arranged. Referring to FIG. 4, a home appliance in which the plurality of antenna modules and the plurality of transceiver circuit modules are arranged may be a television, but is not limited thereto. Accordingly, in this specification, a home appliance in which the plurality of antenna modules and the plurality of transceiver circuit modules are arranged may include any home appliance or display device each configured to support a communication service in a mmWave band.

Referring to FIG. 4, an electronic device 1000 includes a plurality of antenna modules ANT1 to ANT4 and a plurality of transceiver circuit modules 1210*a* to 1210*d*. In relation to this, the plurality of transceiver circuit modules 1210*a* to 1210*d* may correspond to a transceiver circuit 1250 as described above. Alternatively, the plurality of transceiver circuit modules 1210*a* to 1210*d* may be a partial configuration of the transceiver circuit 1250 or a partial configuration of a front end module arranged between the antenna module and the transceiver circuit 1250.

The plurality of antenna modules ANT 1 to ANT4 may be configured as an array antenna in which a plurality of antenna elements are arranged. A number of elements of the antenna modules ANT 1 to ANT4 is not limited to two, three, four, or the like as illustrated in the drawing. For example, the number of the elements of the antenna modules ANT 1 to ANT4 may extend to 2, 4, 8, 16, or the like. In addition, the elements of the antenna modules ANT 1 to ANT4 may be selected in a same number or in different numbers. The plurality of antenna modules ANT 1 to ANT4 may be arranged in different regions in a display, or in a lower portion or on a side surface of the electronic device. The plurality of antenna modules ANT 1 to ANT4 may be arranged in an upper portion, a left portion, a lower portion, or a right portion of the display. However, an arrangement structure thereof is not limited thereto. As another example, the antenna modules ANT 1 to ANT4 may be arranged in an upper left portion, an upper right portion, a lower left portion, or a lower right portion of the display.

The antenna modules ANT 1 to ANT4 may be configured to transmit or receive a signal in a particular direction in any frequency band. For example, the antenna modules ANT 1 to ANT4 may operate in any one of a 28 GHz band, a 39 GHz band, and a 64 GHz band.

The electronic device may maintain a connection state with different entities through two or more of the antenna modules ANT 1 to ANT4, or perform a data transmitting or receiving operation to maintain the connection state described above. In relation to this, the electronic device corresponding to a display device may transmit or receive data with a first entity through the first antenna module ANT1. Also, the electronic device may transmit or receive data with a second entity through the second antenna module ANT2. As an example, the electronic device may transmit or receive data to/from a mobile terminal UE through the first antenna module ANT1. The electronic device may transmit or receive data with a control device such as a set-top box or an access point (AP) through the second antenna module ANT2.

Data may be transmitted or received with another entity through other antenna modules, e.g., the third antenna module ANT3 and the fourth antenna module ANT4. As another example, dual connection or MIMO may be performed through at least one of the first and second entities both previously connected via the third antenna module ANT3 and the fourth antenna module ANT4.

Mobile terminals UE1 and UE2 may be arranged in a front of the electronic device, and configured to communicate with the first antenna module ANT1. Meanwhile, the set-top box STB or the access point AP may be arranged in a lower portion of the electronic device, and configured to communicate with the second antenna module ANT2, but is not limited thereto. As another example, the second antenna module ANT2 may include both a first antenna radiating toward a lower region and a second antenna radiating toward a front region. Accordingly, the second antenna module ANT2 may communicate with the set-top box STB or the access point AP through the first antenna, and with one of the mobile terminals UE1 and UE2 through the second antenna.

Meanwhile, one of the mobile terminals UE1 and UE2 may be configured to perform MIMO with the electronic device. As an example, the UE1 may be configured to perform MIMO while performing beamforming with the electronic device. As described above, the electronic device corresponding to the image display device may perform high-speed communication with another electronic device or the set-top box STB through a WiFi wireless interface. As an example, the electronic device may perform high-speed communication in a 60 GHz band with another electronic device or the set-top box STB through the 802.11ay wireless interface.

Meanwhile, the transceiver circuit modules 1210*a* to 1210*d* may operate to process a transmission signal and a reception signal in an RF frequency band. Here, the RF frequency band may be any frequency band of a millimeter band, such as a 28 GHz band, a 39 GHz band, and a 64 GHz band, as described above. The transceiver circuit modules 1210*a* to 1210*d* may be referred to as RF sub-modules 1210*a* to 1210*d*. In this case, the number of the RF sub-modules 1210*a* to 1210*d* is not limited to four, and may be changed to an arbitrary number of two or more depending on applications.

In addition, the RF sub-modules 1210*a* to 1210*d* may include an up-conversion module and a down-conversion module that convert a signal in the RF frequency band into a signal in an IF (intermediate frequency) band or convert a signal in the IF frequency band into a signal in the RF frequency band. To do so, the up-conversion module and the down-conversion module may respectively include a local oscillator (LO) capable of performing up-frequency conversion and down-frequency conversion.

Meanwhile, the plurality of RF sub-modules 1210*a* to 1210*d* may be configured such that a signal is transmitted from one module among the plurality of transceiver circuit modules to an adjacent transceiver circuit module. Accordingly, the transmitted signal may be configured to transmitted to all of the plurality of transceiver circuit modules 1210*a* to 1210*d* at least once.

To do so, a data transmission path (data transfer path) having a loop structure may be added. In relation to this, the RF sub-modules 1210*b* and 1210*c* may bidirectionally transmit a signal to an adjacent RF sub-module through a transfer path P2 having the loop structure.

Alternatively, a data transmission path having a feedback structure may be added. In relation to this, through the data transmission path having the feedback structure, at least one sub-module 1210*c* may transmit a signal to the other sub-modules 1210*a*, 1210*b*, and 1210*c* unidirectionally.

The plurality of RF sub-modules may include first to fourth RF sub-modules 1210*a* to 1210*d*. In relation to this, a signal from the first RF sub-module 1210*a* may be transmitted to the RF sub-module 1210*b* and the fourth RF sub-module 1210*d* both adjacent thereto. In addition, the second RF sub-module 1210*b* and the fourth RF sub-module 1210*d* may transmit the signal to the third RF sub-module 1210*c* adjacent thereto. At this time, when bidirectional transmission between the second RF sub-module 1210*b* and the third RF sub-module 1210*c* may be performed as shown in FIG. 4, this may be referred to as a loop structure. On the other hand, when only unidirectional transmission may be performed between the second RF sub-module 1210*b* and the third RF sub-module 1210*c*, this may be referred to as a feedback structure. Meanwhile, in the feedback structure, at least two signals may be transmitted to the third RF sub-module 1210*c*.

However, a structure is not limited thereto, and a baseband module may be included only in a particular module among the first to fourth RF sub-modules 1210*a* to 1210*d* depending on applications. Alternatively, depending on an application, a baseband module may not be included in the first to fourth RF sub-modules 1210*a* to 1210*d*, but may be configured as a separate controller, that is, a baseband processor 1400. For example, a control signal may be transmitted only by a separate controller, that is, the baseband processor 1400.

Meanwhile, a specific configuration and function of the electronic device illustrated in FIG. 1 and including the wireless interface of FIG. 2 will be described. Transmission or reception of data between electronic devices needs to be performed using a communication service between the electronic devices in a mmWave band. In relation to this, a wireless audio-video (AV) service and/or high-speed data transmission may be provided using the 802.11ay wireless interface as a mmWave wireless interface. In this case, the mmWave wireless interface is not limited to the 802.11ay wireless interface, and any wireless interface of a 60 GHz band may be adopted. In relation to this, a 5G or 6G wireless interface using a 28 GHz band or a 60 GHz band may be used for high-speed data transmission between electronic devices.

There is a problem such that, with respect to an antenna and an RFIC configured to provide a wireless interface in an electronic device such as an image display device, a specific solution for transmitting an image with a resolution of 4 K or higher is not present. In particular, in consideration of a situation in which an electronic device such as an image display device is arranged on a wall of a building or on a table, wireless AV data may need to be transmitted or received to/from another electronic device. To do so, with respect to regions in which the antenna and the RFIC are to be arranged in the image display device, a specific configuration and an antenna structure need to be presented.

Figure 5A:
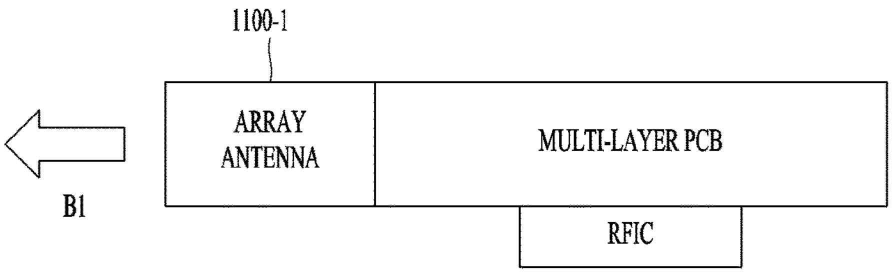
FIG. 5A illustrates a configuration in which a multi-layer circuit substrate on which an array antenna module is arranged is connected to a radio frequency integrated chip (RFIC), in relation to this specification.
Figure 5A:
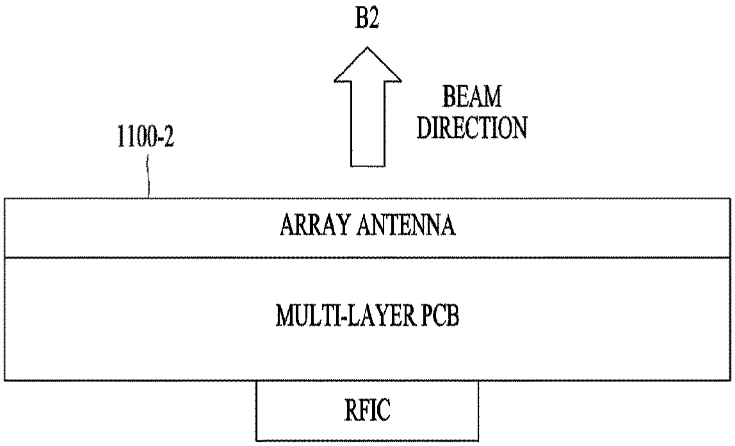

In this regard, FIG. 5A illustrates a configuration in which a multi-layered circuit substrate on which an array antenna module is arranged is connected to an RFIC, in relation to this specification. Specifically, in relation to this specification, a structure of an antenna in package (AIP) module and an antenna module structure implemented on a flexible substrate are illustrated.

Referring to (a) of FIG. 5A, the AIP module is configured as an RFIC-PCB-antenna integrated type for mmWave band communication. In relation to this, an array antenna module 1100-1 may be configured integrally with a multi-layer substrate (a multi-layer printed circuit board (PCB)) as illustrated in (a) of FIG. 5A. Accordingly, the array antenna module 1100-1 configured integrally with the multi-layer substrate may be referred to as an AIP module. Specifically, the array antenna module 1100-1 may be arranged in one side region of the multi-layer substrate. In relation to this, a first beam B1 may be generated in a side surface region of the multi-layer substrate using the array antenna module 1100-1 arranged on the one side region of the multi-layer substrate.

On the other hand, referring to (b) of FIG. 5A, an array antenna module 1100-2 may be arranged on the multi-layer substrate. The arrangement of the array antenna module 1100-2 is not limited to the structure of (b) of FIG. 5A, but may be performed on any layer inside the multi-layer substrate. In relation to this, a second beam B2 may be generated toward a front region of the multi-layer substrate using the array antenna module 1100-2 arranged on any layer of the multi-layer substrate. In relation to this, in a case of the AIP module, i.e., an array antenna module provided integrally with the multi-layer substrate, an array antenna may be arranged on a same PCB to minimize a distance between the RFIC and an antenna.

Meanwhile, the antenna of the AIP module may be implemented using a multi-layer PCB manufacturing process, and radiate a signal in a vertical/side direction of the PCB. In relation to this, double polarization may be implemented using a patch antenna or a dipole/monopole antenna. Accordingly, the first array antenna 1100-1 shown in (a) of FIG. 5A may be arranged on a side surface region of the multi-layer substrate, and the second array antenna 1100-2 shown in (b) of FIG. 5A may be arranged on a side surface region of the multi-layer substrate. Therefore, the first beam B1 may be generated through the first array antenna 1100-1, and the second beam B2 may be generated through the second array antenna 1100-2.

The first array antenna 1100-1 and the second array antenna 1100-2 may be configured to have same polarization. Alternatively, the first array antenna 1100-1 and the second array antenna 1100-2 may be configured to have orthogonal polarization. In this regard, the first array antenna 1100-1 may operate as a vertically polarized antenna or operate as a horizontally polarized antenna. As an example, the first array antenna 1100-1 may be a monopole antenna having vertical polarization, and the second array antenna may be a patch antenna having horizontal polarization.

Figure 5B:
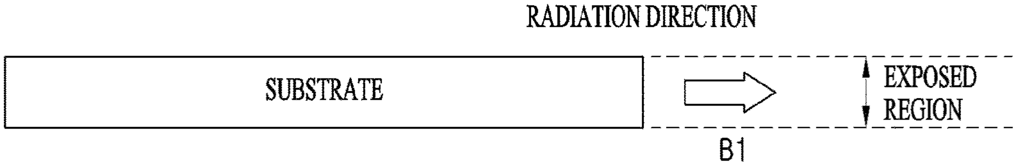
FIG. 5B is a conceptual diagram illustrating antenna structures having different radiation directions.
Figure 5B:
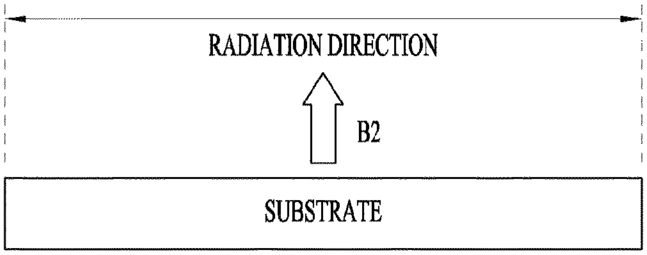

Meanwhile, FIG. 5B is a conceptual diagram illustrating antenna structures having different radiation directions.

Referring to (a) of FIG. 5A and (a) of FIG. 5B, a radiation direction of an antenna module arranged in the side region of the multi-layer substrate corresponds to a side direction. In relation to this, antennas implemented on a flexible substrate may be configured as radiating elements such as a dipole/monopole antenna. That is, antennas implemented on the flexible substrate may be end-fire antenna elements.

In relation to this. end-fire radiation may be implemented by an antenna radiating in a direction horizontal to the substrate. Such an end-fire antenna may be implemented as a dipole/monopole antenna, a Yagi-dipole antenna, a Vivaldi antenna, a substrate integrated waveguide (SIW) horn antenna, or the like. In relation to this, the Yagi-dipole antenna and the Vivaldi antenna have horizontal polarization characteristics. Meanwhile, one of the antenna modules arranged in the image display device disclosed herein needs a vertically polarized antenna. Accordingly, there is a need to present an antenna structure capable of minimizing an antenna exposure region while operating as a vertically polarized antenna.

Referring to (b) of FIG. 5A and (a) of FIG. 5B, a radiation direction of the antenna module arranged on a front surface region of the multi-layer substrate corresponds to a front direction. In relation to this, an antenna arranged in the AIP module may be configured as a radiating element such as a patch antenna. That is, antennas arranged in the AIP module may be broadside antenna elements radiating in a broadside direction.

Figure 5C:
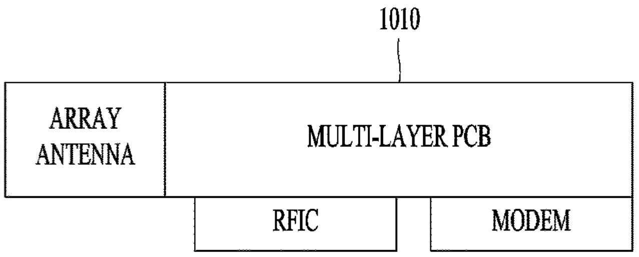
FIG. 5C illustrates a combination structure between a multi-layer substrate and a main substrate according to embodiments.
Figure 5C:
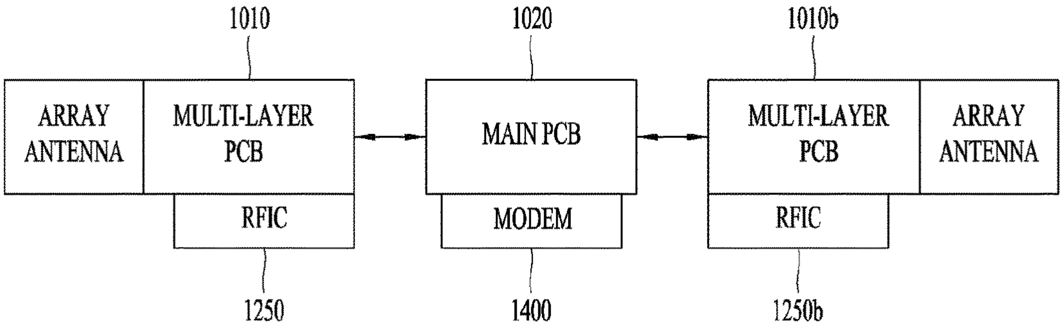

Meanwhile, the multi-layer substrate having the array antenna placed therein may be arranged integrally with a main substrate or may be configured to be combined with the main substrate as a modular type by a connector. In relation to this, FIG. 5C illustrates a combination structure between the multi-layer substrate and the main substrate according to embodiments. Referring to (a) of FIG. 5C, a structure in which an RFIC 1250 and a modem 1400 are integrally arranged on a multi-layer substrate 1010 is shown. The modem 1400 may be referred to as the baseband processor 1400. Accordingly, the multi-layer substrate 1010 is arranged integrally with the main substrate. The integrated structure may be applied to a structure in which only one array antenna module is arranged in the electronic device.

On the other hand, the multi-layer substrate 1010 and a main substrate 10120 may be configured to be combined with each other as a modular type by a connector. Referring to (b) of FIG. 5C, in relation to this, the multi-layer substrate 1010 may be configured to interface with a main substrate 1020 through a connector. In this case, the RFIC 1250 may be arranged on the multi-layer substrate 1010, and the modem 1400 may be arranged on the main substrate 1020. Accordingly, the multi-layer substrate 1010 may be configured as a substrate separate from the main substrate 1020 and configured to be combined with the main substrate 1020 through the connector.

Such a modular structure may be applied to a structure in which a plurality of array antenna modules are arranged in the electronic device. Referring to (b) of FIG. 5C, the multi-layer substrate 1010 and a second multi-layer substrate 1020 may be configured to interface with the main substrate 1020 through connector connection. The modem 1400 arranged on the main substrate 1020 is configured to be electrically coupled to RFICs 1250 and 1250*b* arranged on the multi-layer PCB 1010 and a second multi-layer PCB 1020, respectively.

Figure 6:
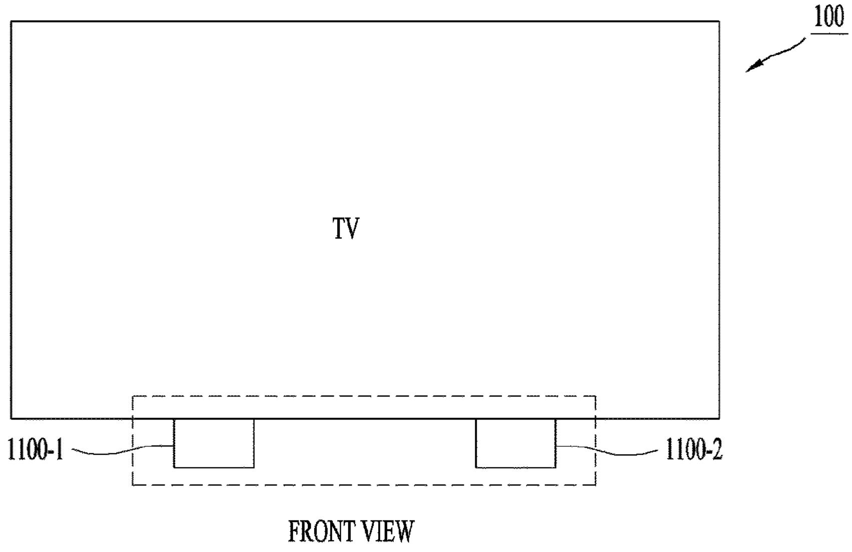
FIG. 6 is a conceptual diagram illustrating a plurality of communication modules arranged in a lower portion of an image display device, a configuration of the corresponding communication modules, and communication performed between the communication modules and other communication modules arranged in a front direction.
Figure 6:
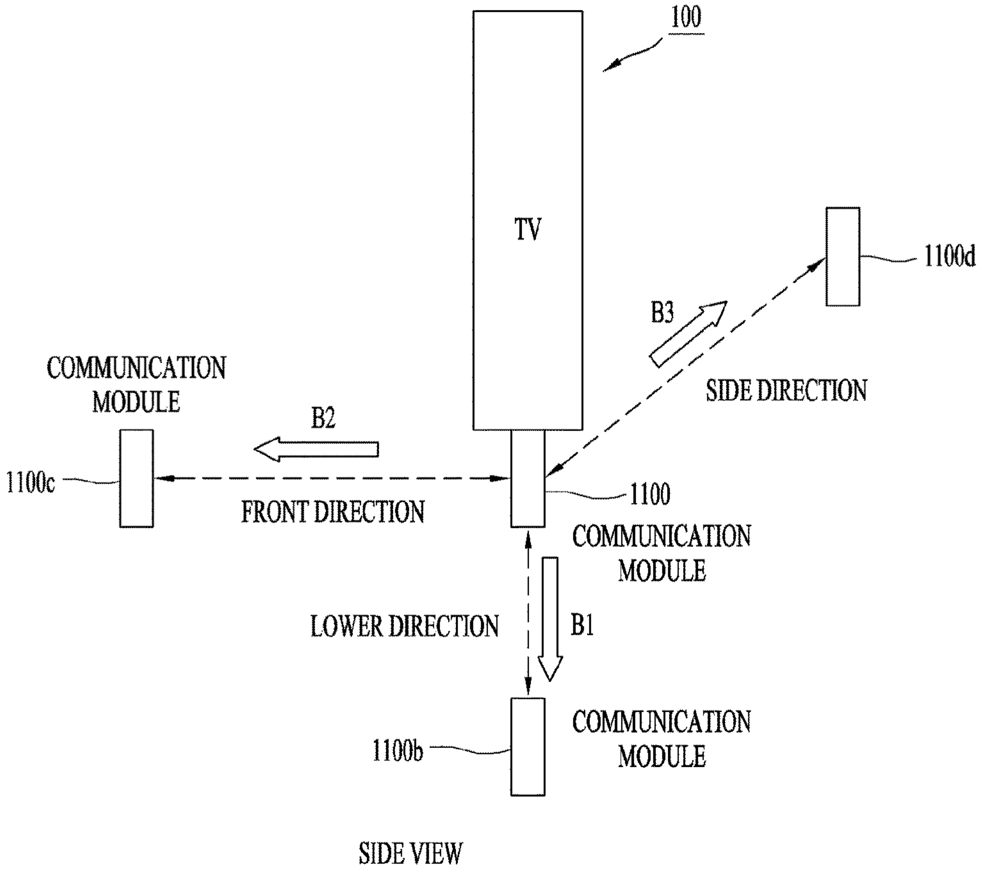

Meanwhile, when the AIP module is arranged in a lower portion of the electronic device such as an image display device, communication needs to be performed with other communication modules arranged in a lower direction and a front direction. In relation to this, FIG. 6 is a conceptual diagram illustrating a plurality of communication modules arranged in a lower portion of an image display device, a configuration of the corresponding communication modules, and communication performed between the communication modules and other communication modules arranged in a front direction. Referring to (a) of FIG. 6, different communication modules 1100-1 and 1100-2 may be arranged in a lower portion of the image display device 100. Referring to (b) of FIG. 6, the image display device 100 may perform communication with a communication module 1100*b* arranged therebelow through an antenna module 1100. In addition, communication may be performed with a second communication module 1100*c* arranged in front of the image display device 100 through the antenna module 1100 of the image display device 100. In relation to this, the communication module 1100*b* may be a set-top box or an access point (AP) that transmits AV data to the image display device 100 through an 802.11ay wireless interface at a high speed, but is limited thereto. Meanwhile, the second communication module 1100*c* may be any electronic device that transceives data to/from the image display device 100 at a high speed through the 802.11ay wireless interface.

Meanwhile, in the AIP module structure as illustrated in (a) of FIG. 5A, an antenna height may increase depending on an RFIC driving circuit and a heat dissipation structure. Also, depending on a type of an antenna that is being used, an antenna height may increase in the AIP module structure as shown in (a) of FIG. 5A. On the other hand, in the antenna module structure implemented in a side region of the multi-layer substrate as illustrated in (b) of FIG. 5A, an antenna may be implemented in a low-profile shape.

Meanwhile, a detailed configuration of the antenna modules of FIGS. 5A to 5C, which may be arranged inside or on a side surface of the electronic device of FIGS. 4 and 6, in the electronic device of FIGS. 1 to 2 and the configurations of FIGS. 3A and 3B, is to be described.

A communication module including an antenna may be arranged so that an electronic device such as an image display device may perform communication with a neighboring electronic device. Meanwhile, recently, as a display area of an image display device is enlarged, an arrangement space of a communication module including an antenna is reduced. Accordingly, there is an increasing need to arrange an antenna in a multi-layer circuit substrate on which a communication module is implemented.

Meanwhile, a WiFi wireless interface may be taken into account, as an interface for a communication service between electronic devices. When such a WiFi wireless interface is used, a millimeter wave (mmWave) band may be used for high-speed data transmission between the electronic devices. In particular, high-speed data transmission between electronic devices may be performed using a wireless interface such as an 802.11ay wireless interface.

In relation to this, an array antenna capable of operating in a mmWave band may be mounted in an antenna module. However, electronic components such as an antenna and a transceiver circuit arranged in such an antenna module are configured to be electrically connected to each other. To do so, the transceiver circuit may be operably coupled to the antenna module, and the antenna module may be configured as a multi-layer substrate.

As the multi-layer substrate of the antenna module is arranged to have a planar stacked structure, a constraint may occur when a vertically polarized antenna is implemented. In this regard, a length of the vertically polarized antenna may be configured to be greater than a height of the multi-layer substrate. Due to the constraint in the height of the multi-layer substrate, there is a problem in that antenna performance may deteriorate when the vertically polarized antenna is configured to have a small length.

In addition, when a dual-polarized antenna for a horizontally polarized antenna and a vertically polarized antenna is implemented, a combination structure between PCBs of different multi-layer substrates may be configured. In the combination structure between the PCBs of these different multi-layer substrates, lengths from respective feeding lines to the vertically polarized antenna and the horizontally polarized antenna may be configured to be different from each other. Accordingly, performance differences between the vertically polarized antenna and the horizontally polarized antenna may occur, or a feed loss may increase in a mmWave band due to an increase in lengths of the feeding lines. Therefore, there is a problem such that an antenna gain of an antenna module having the combination structure between PCBs of different multi-layer substrates may be worsened.

An object of this specification to solve the above-mentioned problems is to provide an antenna module in which a vertically polarized antenna operating in a mmWave band is implemented, and an electronic device including the antenna module. Another object of this specification is to implement an antenna that performs radiation from one side of a PCB using an FPCB. Another object of this specification is to provide a vertically polarized antenna through an asymmetric dipole antenna arranged on an FPCB and a PCB. Another object of this specification is to arrange an FPCB to be vertical to a PCB to implement vertical polarization even at a height of the PCB which is insufficient to implement the vertical polarization. Another object of this specification is to implement one pole on an FPCB and another pole on a PCB as radiators to improve performance of vertical polarization, thereby increasing an area to enhance radiation performance. Another object of this specification is to perform wireless communication with a peripheral electronic device by optimally arranging an antenna module on a lower portion of an electronic device.

Figure 7A:
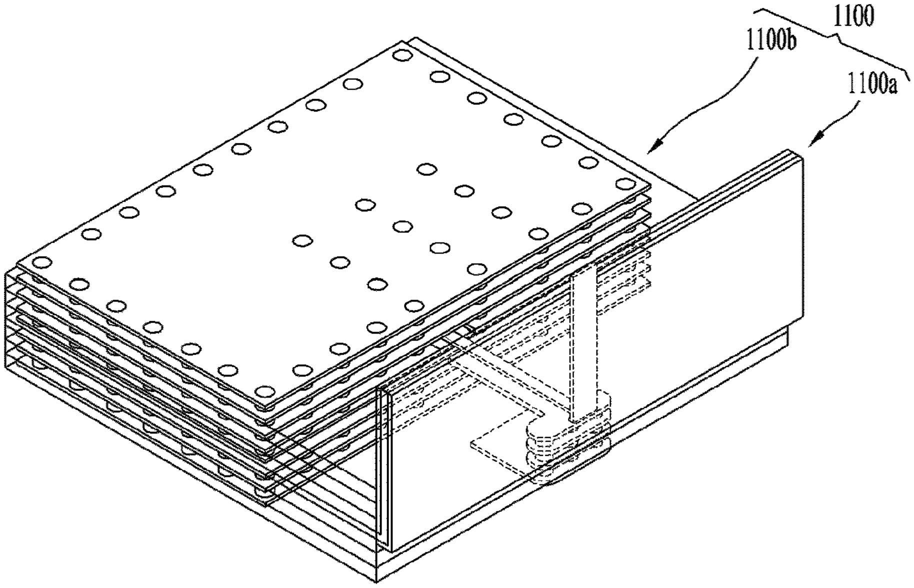
FIG. 7A is a perspective view of a structure in which a printed circuit board (PCB) and a flexible printed circuit board (FPCB) each having antenna elements arranged thereon are connected to each other.
Figure 7B:
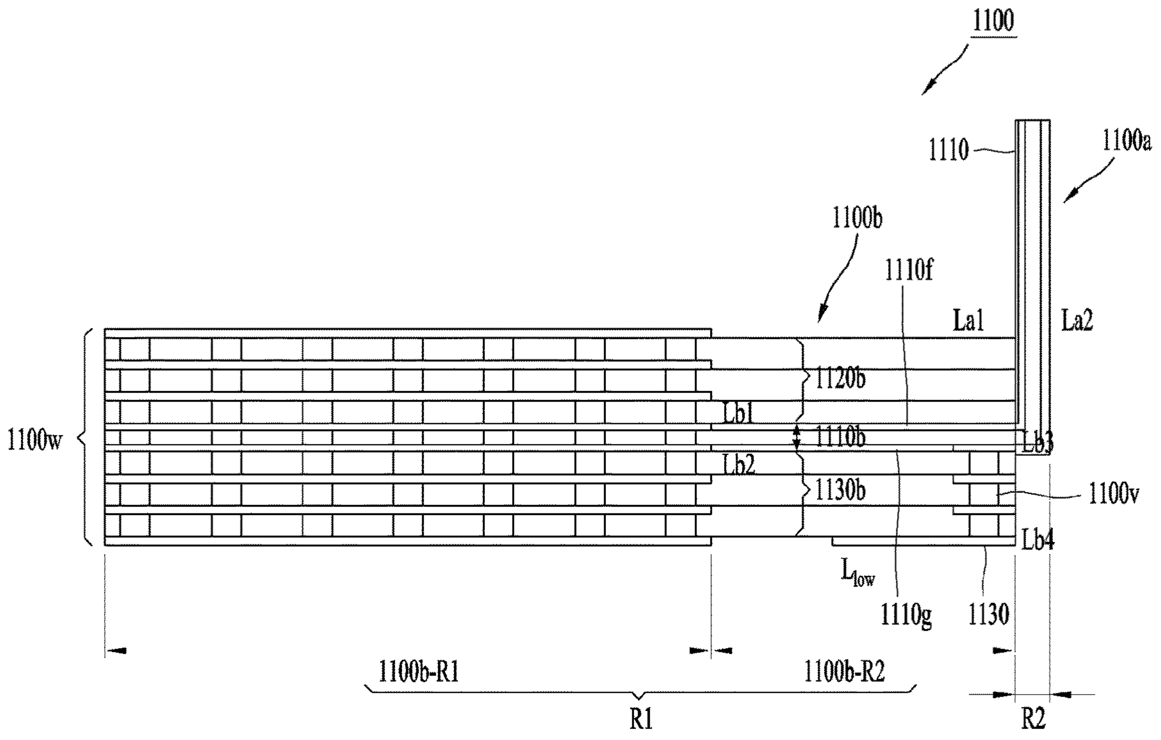
FIG. 7B is a side view of the structure in which the PCB and the FPCB each shown in FIG. 7A are connected to each other.
Figure 7C:
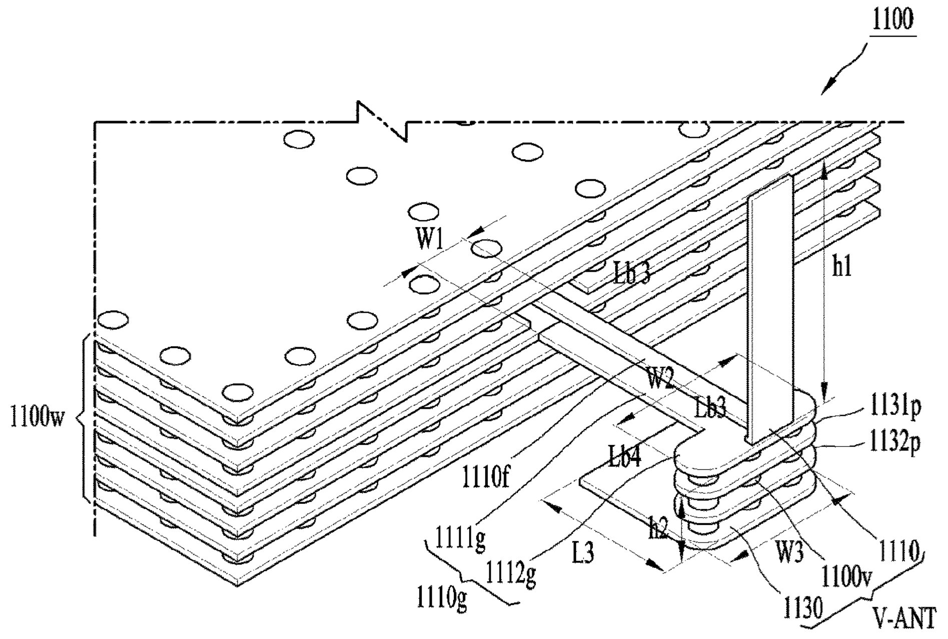
FIG. 7C illustrates a structure of an antenna other than a dielectric region of the PCB.

Hereinafter, an antenna module that operates in a mmWave band according to this specification, and an electronic device including the antenna module are to be described. In this regard, FIG. 7A is a perspective view of a structure in which a PCB and an FPCB each having antenna elements arranged thereon are connected to each other. FIG. 7B is a side view of the structure in which the PCB and the FPCB each shown in FIG. 7A are connected to each other. FIG. 7C illustrates a structure of an antenna other than a dielectric region of the PCB.

Referring to FIGS. 7A and 7B, the antenna module 1100 may be configured to include a flexible printed circuit board (FPCB) 1100*a* and a printed circuit board (PCB) 1100*b* which is a multi-layer substrate. The FPCB 1100*a* may include a plurality of layers. The FPCB 1100*a* may include a first conductive pattern 1110 arranged on a first layer La1, and a second layer La2.

Referring to FIG. 7C, the antenna module 1100 may operate as a vertically polarized antenna V-ANT. The vertically polarized antenna V-ANT may be configured to include the first conductive pattern 1110, a via structure 1100*v*, and a third conductive pattern 1130.

Figure 8:
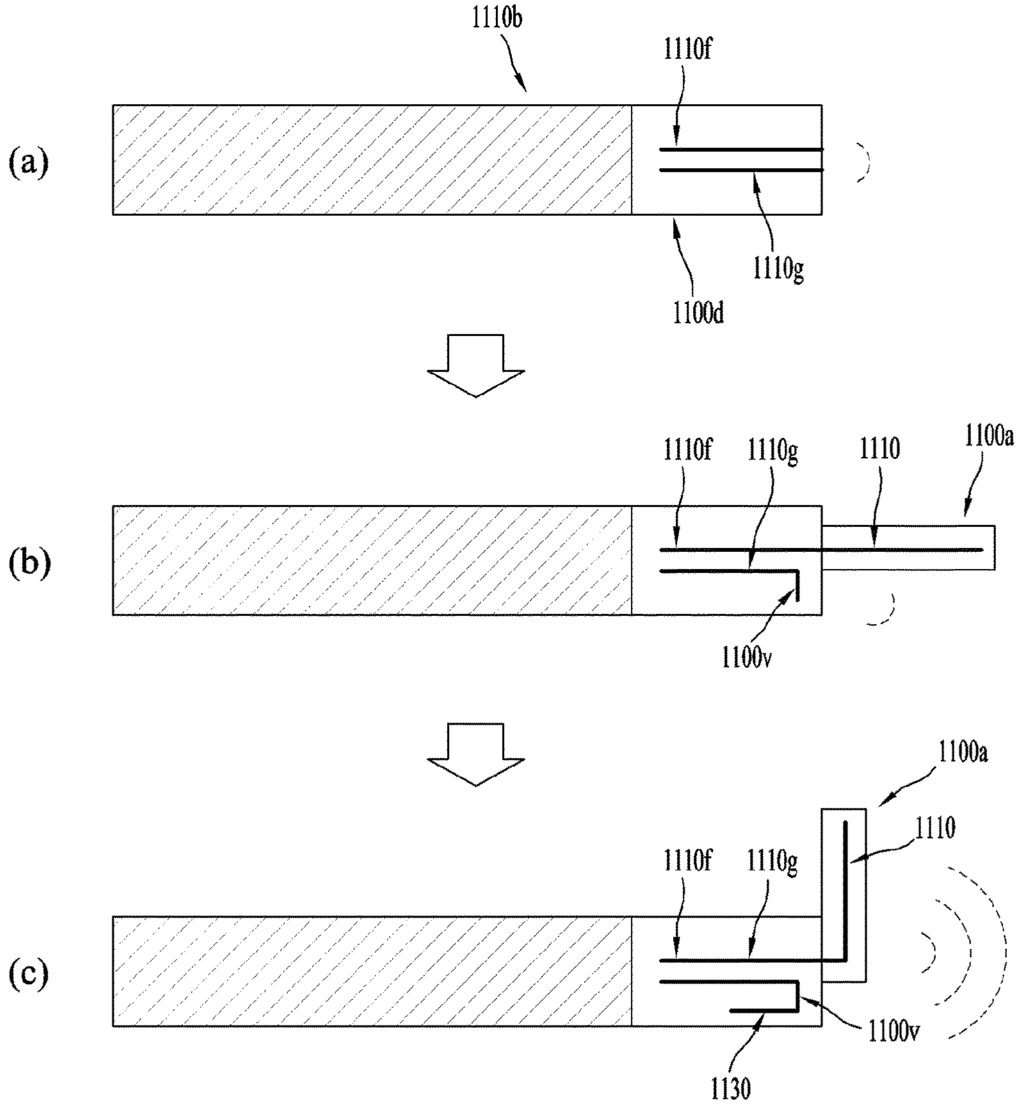
FIG. 8 illustrates various configurations in which a PCB having a feed pattern and a ground pattern placed thereon and an FPCB are connected to each other.

FIG. 8 illustrates various configurations in which a PCB having a feed pattern and a ground pattern placed thereon and an FPCB are connected to each other. Referring to FIG. 8, a structure and a radiation principle of a dual-polarized end-fire antenna in this specification are described.

Referring to (a) of FIG. 8, a first structure in which a feeding line 1110*f* and a ground line 1100*d* are arranged in a dielectric region 1100*d* of the PCB 1100*b* is shown. The feeding line 1110*f* of a vertically polarized antenna is configured to connect the antenna to an RFIC on the PCB 1100*b* which is rigid. The first structure lacks a sufficient space in which a radiator having a pole structure is to be vertically arranged in the PCB without an FPCB. Thus, an amount of radiation according to an electric field of the feeding line 1110*f* is at a critical level or lower, which is very small.

Referring to (b) of FIG. 8, a second structure may be configured to connect the FPCB 1100*a* to the PCB 1100*b* to thereby secure a space in which a radiator having a pole structure is to be vertically arranged inside the PCB. The first conductive pattern 1100 which is a radiator having a pole structure may be arranged on the FPCB 1100*a* of the second structure. As the first conductive pattern 1100 is arranged on a horizontal surface, a radiation region may be generated in a lower region of the FPCB 1100*a*. The via structure 1100*v* may be arranged at an end portion of the ground line 1100*d* of the dielectric region 1100*d* of the second structure. A sub-pattern of the first conductive pattern may be arranged in parallel with the first conductive pattern on the FPCB 1100*a* of the second structure. The sub-pattern of the second conductive pattern may operate as ground of the first conductive pattern 1110 or be connected to the first conductive pattern 1110 through a via to operate as a radiator.

Referring to (c) of FIG. 8, a third structure may be arranged to have a shape in which the FPCB 1100*a* is bent substantially vertically to the PCB 1100*b* at an angle of about 90 degrees. In the third structure, a first conductive pattern 1100*a* arranged on the FPCB 1100*a* may define an upper-end pole as a first portion of a vertically polarized antenna. In the third structure, the via structure 1100*v* and the third conductive pattern 1130 each arranged on the PCB 1100*b* may constitute a lower-end pole as a second portion of the vertically polarized antenna. The lower-end pole may extend an antenna length vertically through the via structure 1100*v* inside the PCB 1100*b*.

By folding the FPCB 1100*a* upwardly to arrange the first conductive pattern 1110 vertically and extending the lower-end pole into a C shape through the third conductive pattern 1130, a sufficient antenna length may be obtained using the upper-end pole and the lower-end pole to thereby increase an amount of radiation.

Referring to FIGS. 7A to 7C and (c) of FIG. 8, the vertically polarized antenna V-ANT may be implemented using the PCB 1100*b* implemented as a multi-layer substrate and the FPCB 1100*a*. Meanwhile, two types of a feeding method of the feeding line 1110*f* of the vertically polarized antenna V-ANT including the upper-end pole and the lower-end pole according to this specification may be performed. (1) The first conductive pattern 1110 which is the upper-end pole may be connected to the feeding line 1110*f*, and the third conductive pattern 1130 which is the lower-end pole may be connected to ground of the PCB 1100*b*. (2) Different feeding lines may be connected to the upper-end pole and the lower-end pole, respectively, like a differential feeding scheme. In this regard, phases between different feeding lines may be configured to have a difference of 180 degrees.

Hereinafter, a bonding structure of the PCB 1100*b* and the FPCB 1100*a* constituting an antenna module according to this specification is to be described in detail. In this regard, FIG. 9A and FIG. 9B illustrate a bonding structure of a PCB and an FPCB constituting the antenna module according to this specification.

Figure 9A:
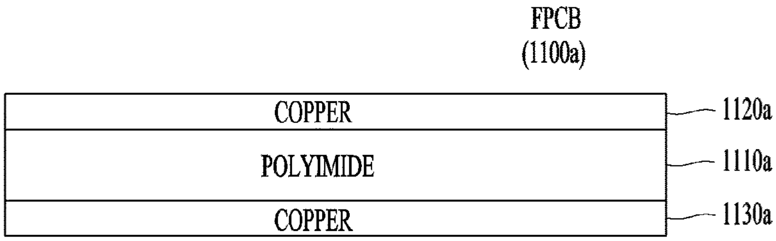
FIG. 9A and FIG. 9B illustrate a bonding structure of a PCB and an FPCB constituting an antenna module according to this specification.
Figure 9A:
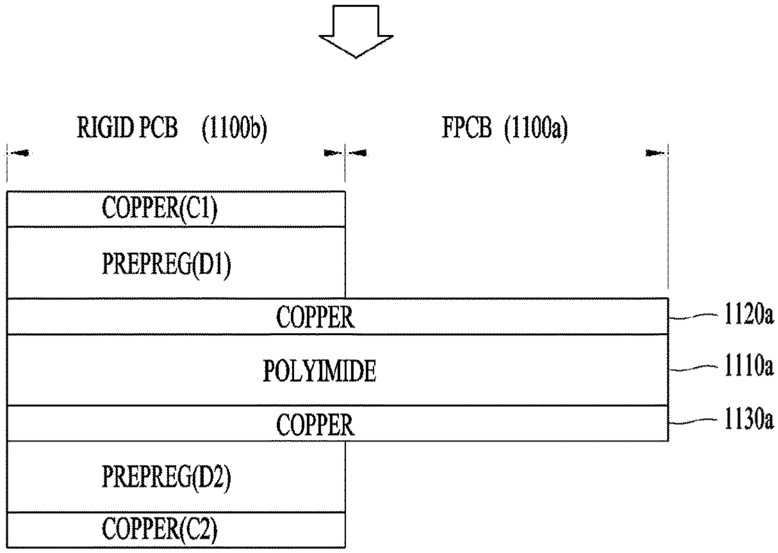
Figure 9B:
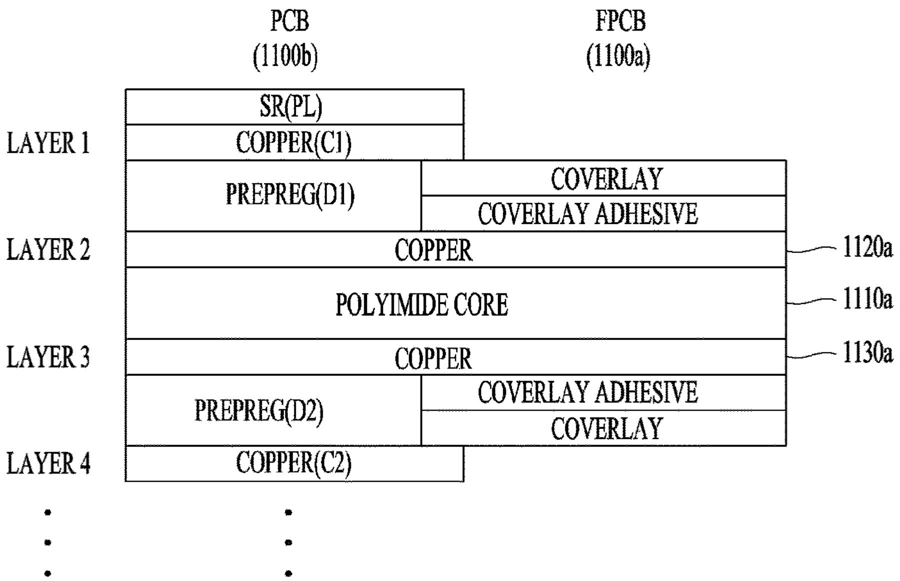
Figure 9B:
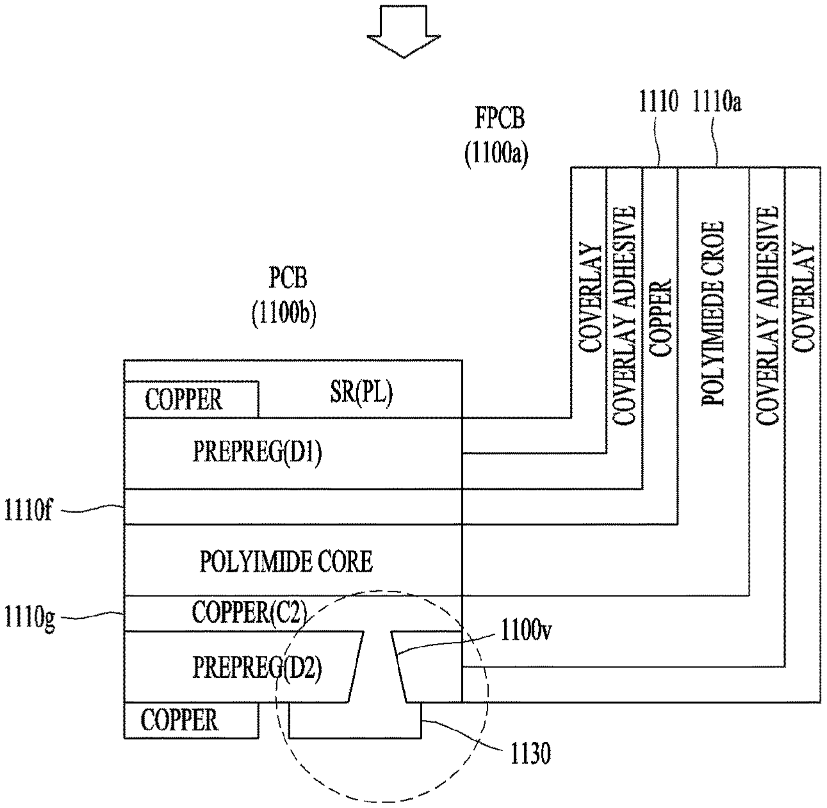

FIG. 9A and FIG. 9B illustrate structures in which the PCB 1100*b* is bonded to the FPCB 1100*a* constituting the antenna module according to this specification, and the FPCB 1100*a* is vertically bent. In the embodiments shown in FIGS. 9A and 9B, the PCB 1100*b* and the FPCB 1100*a* are arranged as an integrated structure.

(a) of FIG. 9A illustrates a stacked structure of the FPCB 1100*a* in which copper 1120*a* and copper 1130*a* are arranged on and below polyimide 1110*a*, respectively. The polyimide 1110*a* is a polymer material, and constitutes a dielectric layer as a raw material of the FPCB 1100*a*, and a metal layer such as copper may be arranged on and below the dielectric layer.

(b) of FIG. 9A illustrates a structure in which the PCB 1100*b* which is rigid is bonded to the FPCB 1100*a*. Prepreg dielectrics D1 and D2 and copper C1 and C2 are stacked only on a region of the PCB 1100*b* of the antenna module. Thus, the antenna module may be divided into a first region constituted by the PCB 1100*b* and a second region constituted by the FPCB 1100*a*. The prepreg dielectrics D1 and D2 may be made of a material such as FR4 or LTCC, but are not limited thereto.

(a) of FIG. 9B illustrates a stack-up shape in which solder regist PLSR and coverlays CL1 and CL2 which are protective layers PL for preventing oxidation of copper are additionally stacked in regions of the rigid PCB 1100*b* and the FPCB 1100*a*. Coverlay adhesives CA1 and CA2 may be arranged to bond the coverlay CL1 and CL2 of the FPCB 1100*a* to the copper 1120*a* and 1130*a*. The PCB 1100*b* and the FPCB 1100*a* may be constituted by two or more multiple layers. The FPCB 1100*a* may correspond to some layers among all the layers of the PCB 1100*b*.

A stack-up structure of (b) of FIG. 9B is a bonding structure of the PCB 1100*b* and the FPCB 1100*a* in which a vertically polarized antenna is implemented. This is an asymmetric dipole antenna shape in which the FPCB 1100*a* is vertically erected to constitute an upper-end pole (upper pole) and a radiation structure having an inverted C-shape is obtained through a laser via in a lower region to implement a lower-end pole (lower pole).

Figure 10A:
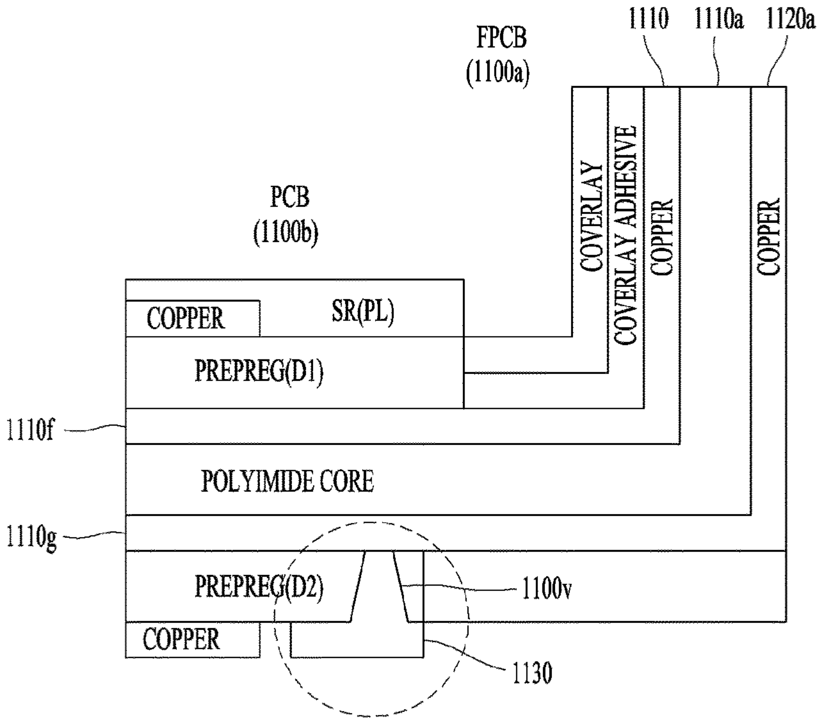
FIGS. 10A and 10B illustrate a structure in which a sub-pattern of a first conductive pattern is arranged on another side of an FPCB of an antenna module according to an embodiment.
Figure 10B:
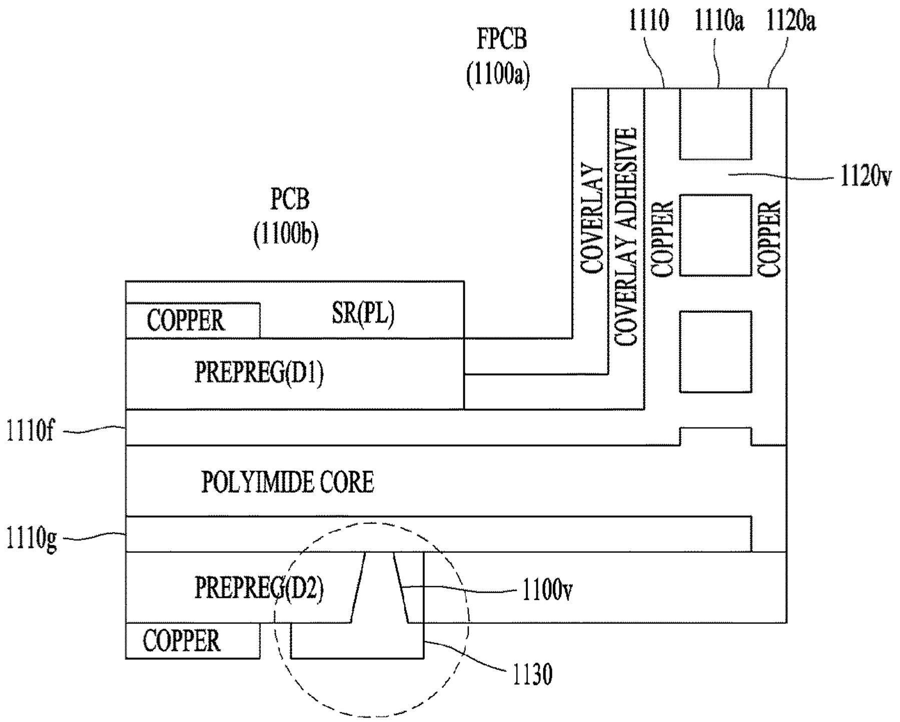

Meanwhile, FIGS. 10A and 10B illustrate a structure in which a sub-pattern of a first conductive pattern is arranged on another side of the FPCB of an antenna module according to an embodiment. Referring to FIG. 10A, the first conductive pattern 1110 on one side of the FPCB 1100*a* may be connected to the feeding line 1110*f* of the PCB 1100*b*. A sub-pattern 1120*a* of the first conductive pattern may be arranged on another side of the FPCB 1100*a*. The sub-pattern 1120*a* of the first conductive pattern may be connected to a second conductive pattern 1110*g* of the PCB 1100*b*. The second conductive pattern 1110*g* is connected to ground of the PCB 1100*b*, and thus, may be referred to as a ground pattern or a ground line. The sub-pattern 1120*a* of the first conductive pattern may be arranged not to overlap a region in which the first conductive pattern 1110 which is an upper-end pole is arranged.

Referring to FIG. 10B, the first conductive pattern 1110 on one side of the FPCB 1100*a* may be connected to the feeding line 1110*f* of the PCB 1100*b*. The sub-pattern 1120*a* of the first conductive pattern may be arranged on another side of the FPCB 1100*a*. The sub-pattern 1120*a* of the first conductive pattern may be configured not to be connected to the second conductive pattern 1110*g* of the PCB 1100*b*. The sub-pattern 1120*a* of the first conductive pattern may be connected to the first conductive pattern 1110 of the FPCB 1100*a* through a via structure 1120*v*. The first conductive pattern 1110 and the sub-pattern 1120*a* of the first conductive pattern may be combined with each other to expand a spatial area occupied by an antenna, thereby improving bandwidth characteristics and efficiency characteristics of the vertically polarized antenna. The sub-pattern 1120*a* of the first conductive pattern may be arranged to overlap a region in which the first conductive pattern 1110 which is an upper-end pole is arranged.

Meanwhile, in the vertically polarized antenna of the antenna module according to this specification, the third conductive pattern which is a lower-end pole, other than the first conductive pattern which is an upper-end pole, constitutes a C-shaped or inverted C-shaped structure connected to a second conductive pattern which operates as ground through a via structure. In this regard, FIGS. 11A and 11B illustrate a structure of a lower-end pole of a vertically polarized antenna having an inverted C-shaped structure in which a third conductive pattern according to this specification is connected to a second conductive pattern through a via structure.

Figure 11A:
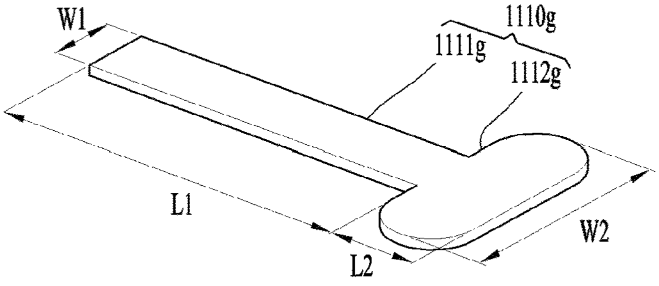
FIGS. 11A and 11B illustrate a structure of a lower-end pole of a vertically polarized antenna having an inverted C-shaped structure in which a third conductive pattern according to this specification is connected to a second conductive pattern through a via structure.
Figure 11A:
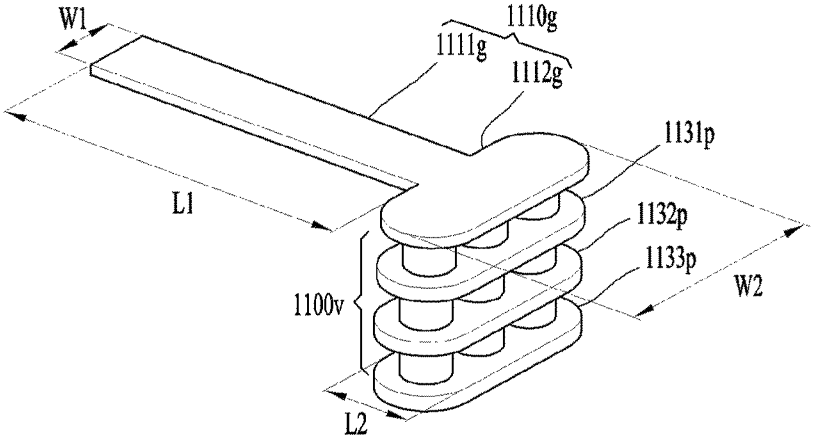
Figure 11B:
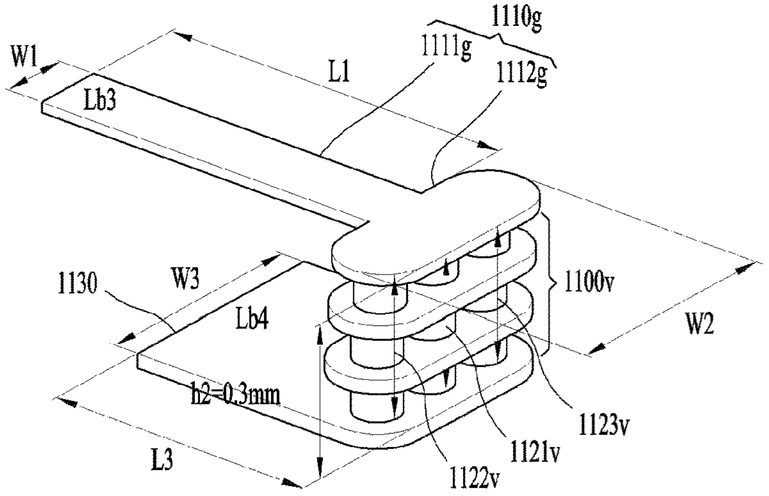
Figure 11B:
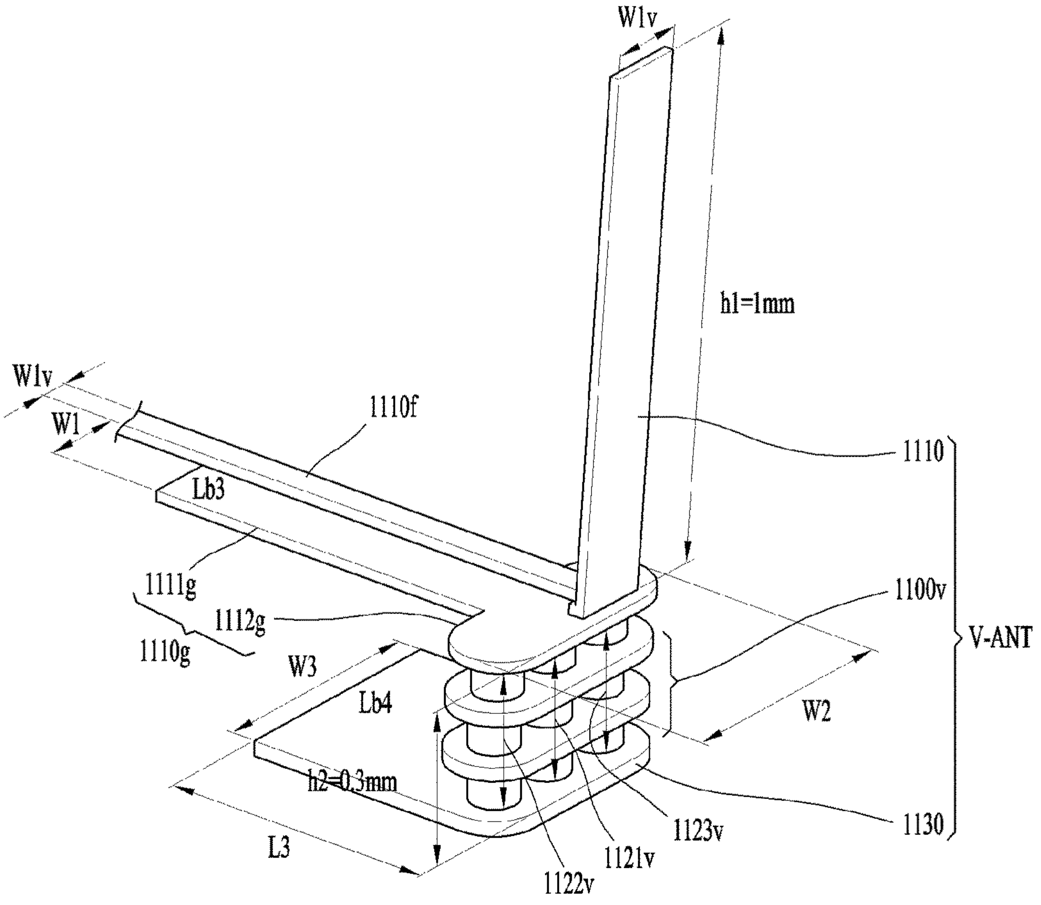

Referring to FIGS. 11A and 11B, diagrams for sequentially explaining an inverted C-shaped structure of a lower portion are shown. A structure in which a length of the second conductive pattern 1110*g* is configured to be longer than a length of the third conductive pattern 1130 may be defined as an inverted C-shaped structure.

Referring to FIGS. 7A to 7C and (a) of FIG. 11A, the second conductive pattern 1110*g* may include a first sub-pattern 1111*g* and a second sub-pattern 1112*g*. The first sub-pattern 1111*g* may be configured to have a first width W1 a first axial direction. The first sub-pattern 1111*g* may be configured to have a first length L1 in a second axial direction. The second sub-pattern 1112*g* may be configured to have a second width W2 greater than the first width W1 in the first axial direction. The second sub-pattern 1112*g* may be configured to have a second length L2 smaller than the first length L1 in the second axial direction. The first sub-pattern 1111*g* and the second sub-pattern 1112*g* may be connected to the ground of the PCB 1100*b*, and referred to as a first ground line (pattern) and a second ground line (pattern), respectively.

Referring to FIGS. 7A to 7C and (b) of FIG. 11A, the second conductive pattern 1110*g* may vertically extend due to the via structure 1100*v* including a plurality of vias arranged in the first axial direction and a third axial direction. A multi-layer structure may be obtained due to the via structure 1100*v*, and via pads in each layer may be electrically connected to each other. The via pads are present in each layer, and include two or more multiple layers.

The second sub-pattern 1112*g* may be vertically connected to one ground pad 1131*p* among the ground pads by a plurality of vias in the first axial direction. Ground pads 1131*p* and 1132*p* may be vertically connected to each other by the plurality of vias in the first axial direction. Ground pads 1132*p* and 1133*p* may be vertically connected to each other by the plurality of vias in the first axial direction. Therefore, the via structure 1100*v* in which the plurality of vias spaced apart from each other in the first axial direction are stacked in the third axial direction is constituted. A plurality of via pads may be arranged in the third axial direction to cause the plurality of vias to be stacked in the third axial direction.

Referring to FIGS. 7A to 7C and (a) of FIG. 11B, a form in which one or more via pads among the plurality of via pads are extended using an extended pad is shown. A lower-end pole from the second conductive pattern 1110*g*, the via structure 1100*v* implemented by the plurality of vias and via pads, to the third conductive pattern 1130 which has an extended pad structure has an inverted C-shaped structure on a whole. The third conductive pattern 1130 may be configured to have a third width W3 in the first axial direction. The third conductive pattern 1130 may be configured to have a third length L3 in the second axial direction.

Referring to FIGS. 7A to 7C and (b) of FIG. 11B, a shape of an asymmetric dipole antenna obtained as a final configuration is shown. A signal is stably transmitted to the feeding line 1110*f* of the upper-end pole by the second conductive pattern 1110*g* of the lower-end pole, and electromagnetic waves are radiated by the upper-end pole and the lower-end pole. A first height h1 of the first conductive pattern 1110 constituting the upper-end pole may be configured to be 1 mm. A second height h2 of the via structure 1100*v* constituting the lower-end pole may be configured to be 0.3 mm. A difference between the first height h1 of the first conductive pattern 1110 and the second height h2 of the via structure 1100*v* may be configured to be approximately 0.7 mm. Therefore, the difference between the first height h1 of the first conductive pattern 1110 and the second height h2 of the via structure 1100*v* is approximately $0.14\lambda_0$ in an electrical length at an operating frequency band of 60 GHz.

Figure 12A:
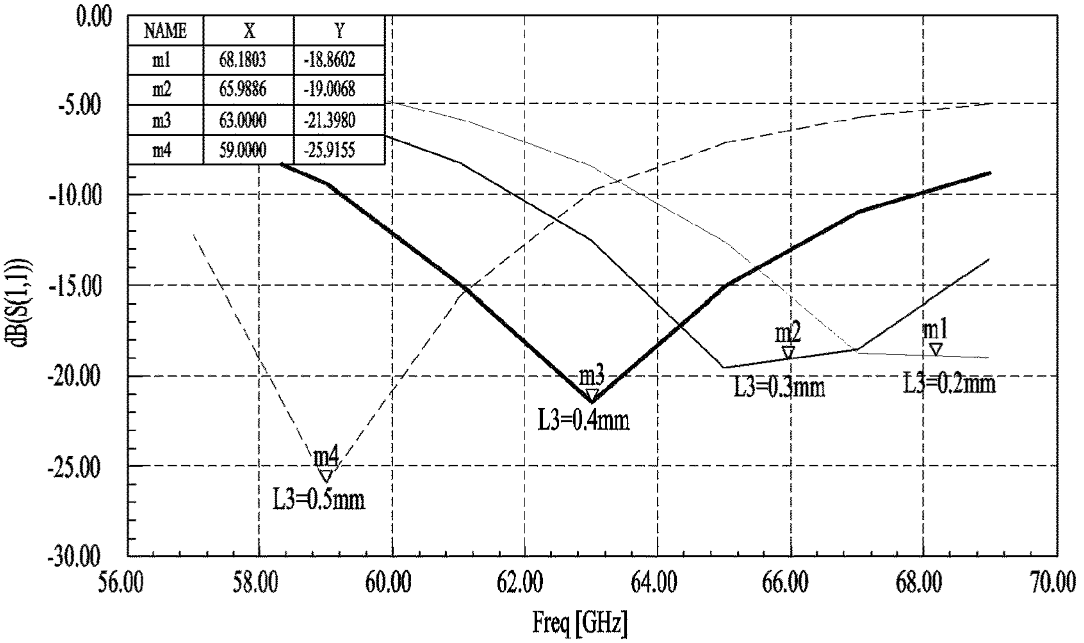
FIG. 12A shows reflection coefficients according to a change in an extended length of a third conductive pattern of a lower-end pole of a vertically polarized antenna.
Figure 12B:
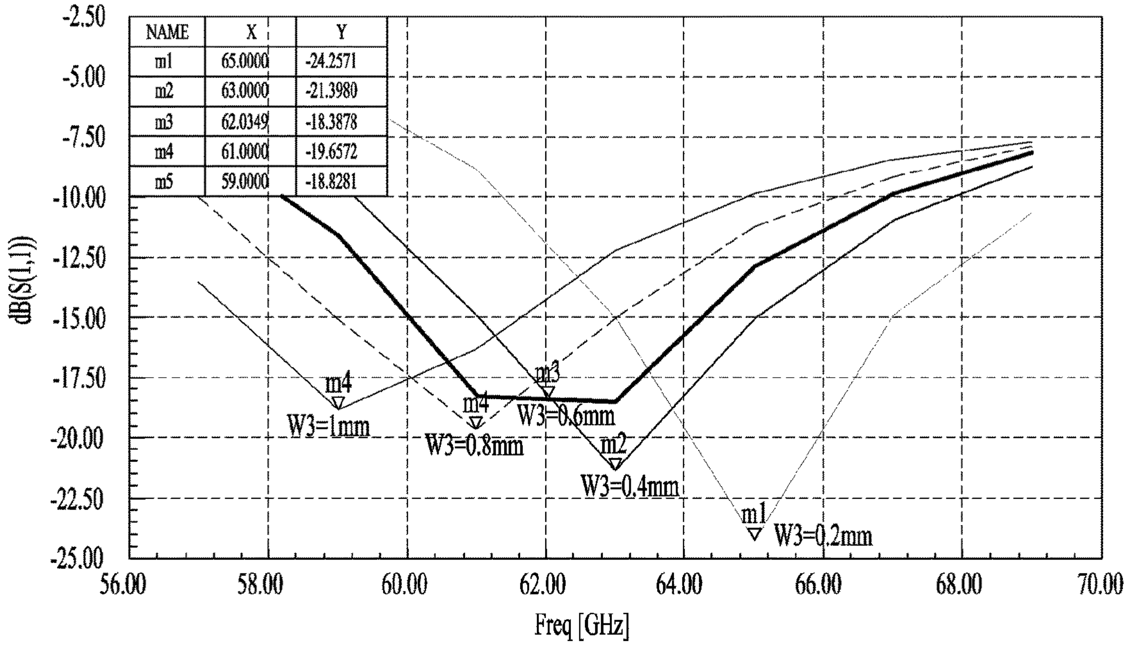
FIG. 12B shows reflection coefficients according to a change in a width of a third conductive pattern of a lower-end pole of a vertically polarized antenna.

Meanwhile, antenna performance may be changed depending on an extended length and width of a third conductive pattern of a lower-end pole of a vertically polarized antenna according to this specification. In this regard, FIG. 12A shows reflection coefficients according to a change in an extended length of a third conductive pattern of a lower-end pole of a vertically polarized antenna. FIG. 12B shows reflection coefficients according to a change in a width of a third conductive pattern of a lower-end pole of a vertically polarized antenna. In this regard, as a width of a third conductive pattern is changed, a width of a second sub-pattern may be configured to be changed correspondingly.

Referring to FIG. 7C, FIG. 11B, and FIG. 12A, an operating frequency band of an antenna may be determined by adjusting a length of the third conductive pattern 1130 which is an extended pad. This is because when a length of the expansion pad is increased, an operating frequency of the antenna shifts downward, and when a length of the expansion pad is reduced, an operating frequency of the antenna shifts upward.

It may be checked that as a length L3 of the third conductive pattern 1130 which is the expansion pad is increased from 0.2 mm to 0.5 mm, a center frequency of an operating frequency band of the antenna shifts downward from 68 GHz to 59 GHz by 9 GHz. In this regard, a length of the third conductive pattern 1130 which is the expansion pad may be defined as a length from end portions of other via pads to an end portion of the third conductive pattern 1130.

Referring to FIGS. 7C, 11B and 12B, a width of the lower-end pole indicates a width of via pads connected to the via structure 1100*v* and a width W3 of the third conductive pattern 1130 which is an expansion pad. A size of an inverted C-shaped antenna may be reduced by increasing a width of the lower-end pole. This is because when either of such two widths is changed, an operating frequency of an antenna is affected. For example, when a width of the lower-end pole is decreased, a resonant frequency shifts upward, and when a width of the lower-end pole is increased, a resonant frequency shifts downward. Therefore, a length of the expansion pad may be reduced by increasing a width of the lower-end pole.

A width of the lower-end pole may be changed by changing the width W3 of the third conductive pattern 1130 which is an expansion pad to 0.2 mm to 1 mm. It may be checked that, as the width W3 of the third conductive pattern 1130 is changed to 0.2 mm to 1 mm, a center frequency of an operating frequency band has shifted downward from 65 GHz to 59 GHz by about 6 GHz.

Figure 13A:
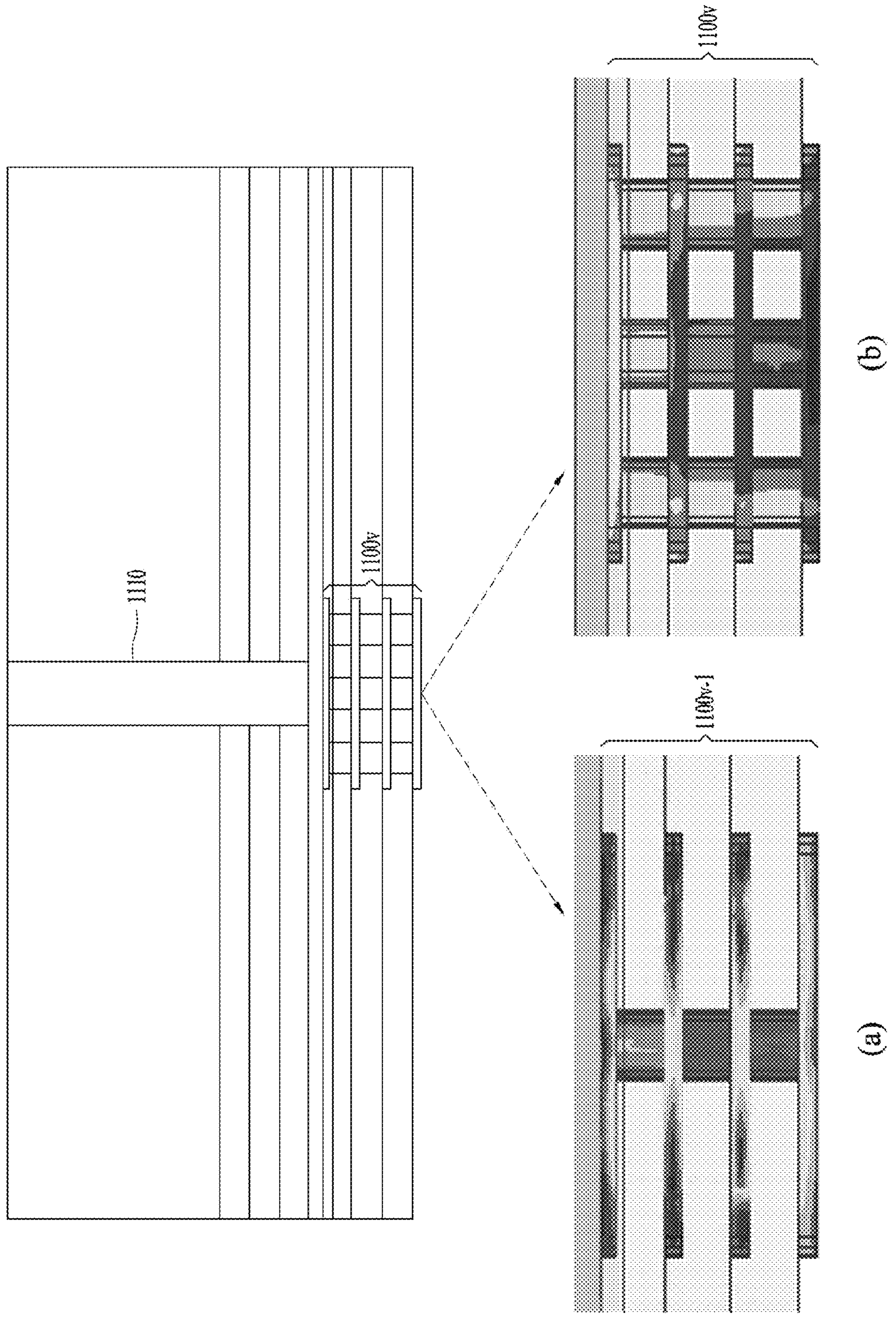
FIG. 13A is one side view of vertically polarized antennas having varying numbers of vias in a first axis direction in a via structure of a lower-end pole.
Figure 13B:
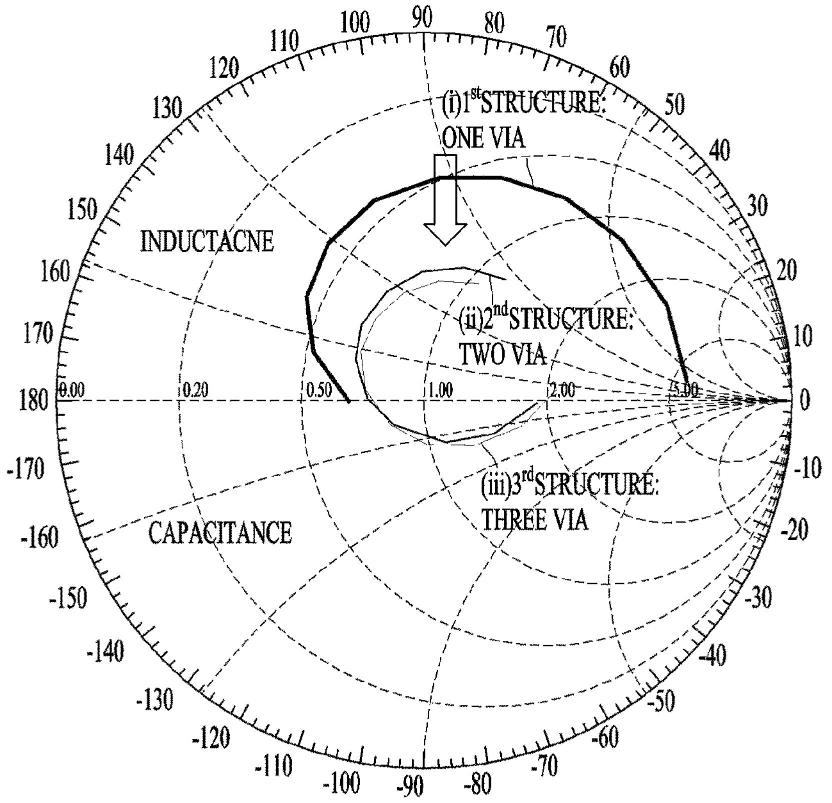
FIG. 13B shows impedance characteristics, presented on a Smith chart, of the vertically polarized antennas of FIG. 13A having varying numbers of vias in the first axial direction.

Meanwhile, a via structure of a lower-end pole of the vertically polarized antenna according to this specification may be implemented as at least one via in the first axial direction. Antenna performance may be changed by adjusting a number of vias in the first axial direction. In this regard, FIG. 13A is one side view of vertically polarized antennas having varying numbers of vias in a first axis direction in a via structure of a lower-end pole. FIG. 13B shows impedance characteristics, presented on a Smith chart, of the vertically polarized antennas of FIG. 13A having varying numbers of vias in the first axial direction.

Referring to FIG. 7C and FIG. 13A, the vertically polarized antenna V-ANT implemented in the FPCB 1100*a* may be implemented as a dipole antenna or a monopole antenna. The via structure 1100*v* of the lower-end pole may be configured as at least one via in the first axial direction. (a) of FIG. 13 illustrates a first via structure 1100*v*-1 in which one via in a first axial direction is stacked in a third axial direction. FIG. 7C and (b) of FIG. 13 illustrate the via structure 1100*v* in which three vias in the first axial direction are stacked in the third axial direction.

Referring to (a) of FIG. 13A, the first via structure 1100*v*-1 having only one via in the first axial direction causes current to be concentrated only into the one via, thus allowing a strong current at a critical level or higher to flow Accordingly, it may be checked that high current distribution is generated only in the one via. However, as shown in (b) of FIG. 13A, when two or more vias are present in the first axial direction, current flows in a distributed manner. Thus, relatively weak current flows in each via. Therefore, inductance proportional to current intensity may be adjusted by a number of vias.

Referring to (b) of FIG. 13, a change in reflection coefficient characteristics S11 according to a number of vias of a vertically polarized FPCB dipole antenna is presented on a Smith chart. Referring to FIGS. 13A and 13B, (i) an impedance chart of a first structure having one via in the first axial direction is present in an upper region of the Smith chart. Therefore, the first structure having one via in the first axial direction shows high inductance characteristics for each frequency. However, (ii) a second structure having two vias in the first axial direction and (iii) a third structure having three vias in the first axial direction may reduce inductance components to cause an impedance characteristic to be close to 50 ohms despite a frequency change, thereby improving antenna performance.

Referring to FIGS. 7A to 13C, an antenna module operating in a mmWave band according to this specification is to be described. The antenna module 1000 may be configured to include the FPCB 1100*a* and the PCB 1100*b*. The FPCB 1100*a* may include the first conductive pattern 1110 arranged on the first layer La1, and the second layer La2.

The antenna module 1000 may be constituted by the multi-layer substrates (multi-layered substrates) 1100*a* and 1100*b* made of a plurality of dielectric materials, and conductive patterns. The FPCB 1100*a* and the PCB 1100*b* may be implemented as the multi-layer substrates (multi-layered substrates). The multi-layer substrates 1100*a* and 1100*b* may be configured to include a first layer 1110*b*, second layers 1120*b*, and third layers 1130*b*.

The first layer 1110*b* may be made of a flexible first material. The second layers 1120*b* may include a plurality of layers made of a stiff (rigid) second material arranged on one side surface of the first layer 1110*b*. The third layers 1130*b* may include a plurality of layers made of the rigid second material arranged on another side surface of the first layer 1110*b*. The first layer 1110*b* may be placed between the second layers 1120*b* and the third layers 1130*b* of the multi-layer substrates 1100*a* and 1100*b*.

The first layer 1110*b* may include the first region R1 arranged in parallel with the second layers 1120*b* and the third layers 1130*b* and the second region R2 arranged vertically to the second layers 1120*b* and the third layers 1130*b*. The first region R1 may be a PCB region and the second region R2 may be an FPCB region.

The conductive patterns may be configured to include the first conductive pattern 1110, the second conductive pattern 1110*g*, and the third conductive pattern 1130. The first conductive pattern 1110 may be arranged on one side surface in the first region R1 and the second region R1 of one side surface of the first layer 1110*a* and configured to transmit and/or receive a signal. The second conductive pattern 1110*g* may be arranged on a lower third layer Lb3 which is one layer among the third layers 1130*b*. The third conductive pattern 1130 may be arranged on a lower fourth layer Lb4 which is another layer among the third layers.

The first conductive pattern 1110 arranged on the first layer La of the FPCB 1100*a* may be configured to have a shape bent at 90 degrees to be connected to a first electrode layer Lb1 of the PCB 1100*b*. The second layer La2 of the FPCB 1100*a* may constitute another side of the layers. The second layer La2 of the FPCB 1100*a* may correspond to a second electrode layer Lb2 of the PCB 1100*b*. The first electrode layer Lb1 and the second electrode layer Lb2 may be referred to as a lower first layer and a lower second layer, respectively. In this regard, the second electrode layer Lb2 which is the lower second layer, and the lower third layer Lb3 may be implemented on a same plane, but are not limited thereto and may be changed depending on applications.

The second layers 1120*b* and the third layers 1130*b* may be referred to as an upper layer structure and a lower layer structure, respectively. The second layers 1120*b* may be made of a hard material and arranged on a first surface of the first electrode layer Lb1. A lower portion of the second layers 1120*b* may be configured as the first electrode layer Lb1. The feeding line 1110*f* may be placed on the first electrode layer Lb1 in the lower portion of the second layers 1120*b*. The third layers 1130*b* may be made of a hard material and arranged on a first surface of the second electrode layer Lb2. The lower portion of the third layers 1130*b* may be configured as the second electrode layer Lb2. The second conductive pattern 1110*g* may be arranged on the second electrode layer Lb2 in a lower portion of the third layers 1130*b*.

The third conductive pattern 1130 may be connected to the third layers 1130*b* by the via structure 1100*v*. The third conductive pattern 1130 may be arranged on a lowest layer $L_{low}$ connected in a C shape to the second conductive pattern 1110*g* through the via structure 1100*c*. The first conductive pattern 1110, the via structure 1100*v*, and the third conductive pattern 1130 may operate as the vertically polarized antenna V-ANT having vertical polarization in a mmWave frequency band.

The second layers 1120*b*, the third layers 1130*b*, and the lowest layer Lb3 may be implemented as the printed circuit board (PCB) 1100*b* configured as a multi-layer substrate. The first conductive pattern 1110 of the FPCB 1100*a* may be connected to the feeding line 1110*f* of the PCB 1100*b*. The second layer La2 of the FPCB 1100*a* may correspond to the second conductive pattern 1110*g* arranged on a lower layer of the feeding line 1110*f* of the PCB 1100*b*. When a sub-pattern of the first conductive pattern is arranged on the second layer La2, the sub-pattern of the first conductive pattern may be connected to the second conductive pattern 1110*g* arranged on the lower layer of the feeding line 1110*f* of the PCB 1100*b*.

The third conductive pattern 1130 arranged on the lowest layer $L_{low}$ may be connected to the second conductive pattern 1110*g* of the PCB 1100*b* through the via structure 1100*v*. In this regard, a location on which the third conductive pattern 1130 is placed is not limited to the lowest layer $L_{low}$, but may be any lower fourth layer Lb4 located lower than the lower third layer Lb3.

The second conductive pattern 1110*g* and the third conductive pattern 1130 may be connected to each other through via holes. The via holes may be configured as the via structure 1100*v* in which adjacent layers of conductive pads are vertically connected to each other. The lower third layer Lb3 may be arranged to be closer to another side surface of the first layer 1110*b* compared to the lower fourth layer Lb3. The lower fourth layer Lb4 may be placed further apart from the another side surface of the first layer 1110*b* compared to the lower third layer Lb3.

A space W1*v* of the first conductive pattern 1110 arranged in the first region R1 may be configured to be narrower than each of spaces W1 and W2 in the second conductive pattern 1110*g* connected to ground of the multi-layer substrate. The second conductive pattern 1110*g* may be constituted by the first sub-pattern 1111*g* connected to one region on the ground of the multi-layer substrate and the second sub-pattern 1112*g* connected to the via holes. A space W1 in the first sub-pattern 1111*g* of the second conductive pattern 1110*g* may be configured to be narrower than a space in the second sub-pattern 1112*g* arranged on the lower fourth layer Lb4 among the third layers.

A length L3 of the third conductive pattern 1130 may be configured to be shorter than a length of the first sub-pattern 1111*g* of the second conductive pattern 1110*g*. An end region of the third conductive pattern 1130 may be arranged to be electrically connected to the second sub-pattern 1112*g* through a plurality of rows 1121*v* to 1123*v* of a plurality of via holes. In this regard, the plurality of via holes arranged in the plurality of rows may be configured to include first via holes 1121*v*, second via holes 1122*v*, and third via holes 1123*v*.

A first height h1 of the first conductive pattern 1110 may be configured to be within a predetermined range with reference to 1 mm. A second height h2 of the via structure 1100*v* between the third conductive pattern 1130 and the second conductive pattern 1110*g* connected to the via structure 1100*v* may be configured to be within a predetermined range with reference to 0.3 mm. The third conductive pattern 1130 arranged on a lowest layer $L_{low}$ may be connected to the second conductive pattern 1110*g* of the PCB 1100*b* through the via structure 1100*v*.

The first height h1 of the first conductive pattern 1110 may be configured to be greater than the second height h2 of the via structure 1100*v* by a predetermined height or greater. A difference between the first height h1 of the first conductive pattern 1110 and the second height h2 of the via structure 1100*v* may be configured to be within a predetermined range with reference to $0.14\lambda_0$ at an operating frequency band of 60 GHz.

The second conductive pattern 1110*g* may be configured to include the first sub-pattern 1111*g* configured to have the first width W1. The second conductive pattern 1110*g* of the PCB 1100*b* may include the second sub-pattern 1112*g* arranged at an end portion of the first sub-pattern 1111*g* to have a second width W2 greater than the first width W1.

The via structure 1100*v* may be configured to connect the second sub-pattern 1112*g* to the third conductive pattern 1130 in a first axial direction. The via structure 1100*v* may include a plurality of vias spaced apart from each other in the first axial direction. The second width W2 of the second sub-pattern 1112*g* may be configured to be in a range between 0.2 mm and 1.0 mm.

The third conductive pattern 1130 may be configured to have a third width W3 in the first axial direction. The third conductive pattern 1130 may be configured to have a third length L3 in a second axial direction vertical to the first axial direction. The third width W3 of the third conductive pattern 1130 may be configured to be identical to the second width W2 of the second conductive pattern 1112*g*. Accordingly, a third width W3 of the third conductive pattern 1130 may be configured to be in a range between 0.2 mm and 1.0 mm. The third conductive pattern 1130 may be configured to have the third length L3 from one side end portion to another side end portion.

At a point adjacent to the one side end portion of the third conductive pattern 1130, the third conductive pattern 1130 may be connected to the second sub-pattern 1112*g* through the plurality of via holes 1121*v* to 1123*v*. The another side end portion of the third conductive pattern 1130 may be located to a point adjacent to an end portion of a ground wall 1100*w* configured as a multilayer structure in an inner region of the PCB 1100*b*.

The antenna module 1100 may further include at least one of conductive pads 1131*p* to 1133*p* placed between the second sub-pattern 1112*g* and the third conductive pattern 1130. The ground pads 1131*p* and 1132*p* may be vertically connected to each other through a plurality of via holes in the first axial direction. The ground pads 1132*p* and 1133*p* may be vertically connected to each other through a plurality of via holes in the first axial direction. The via holes placed in the first axial direction may be arranged vertically in a third axial direction to connect the second sub-pattern 1112*g* and the at least one conductive pad 1131*p*. The plurality of vias placed in the first axial direction may be arranged vertically in the third axial direction to connect the conductive pad 1131*p* to the conductive pad 1132*p*. The plurality of vias placed in the first axial direction may be arranged vertically in the third axial direction to connect the at least one conductive pad 1132*p* to the third conductive pattern 1130.

Figure 14A:
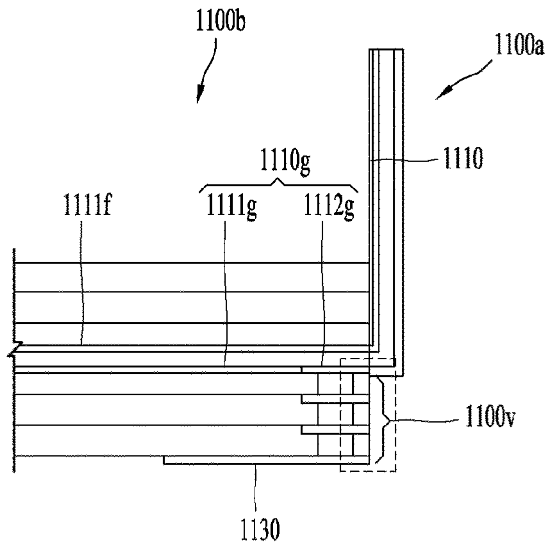
FIGS. 14A and 14B illustrate via structures such that lower-end poles of vertically polarized antennas according to this specification are arranged at different locations on a PCB.
Figure 14B:
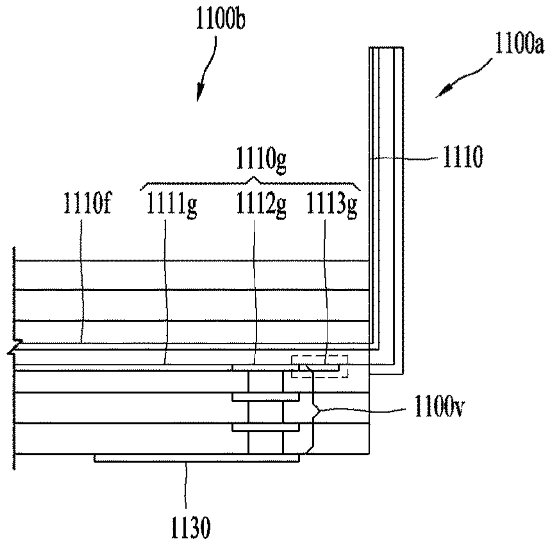
Figure 15A:
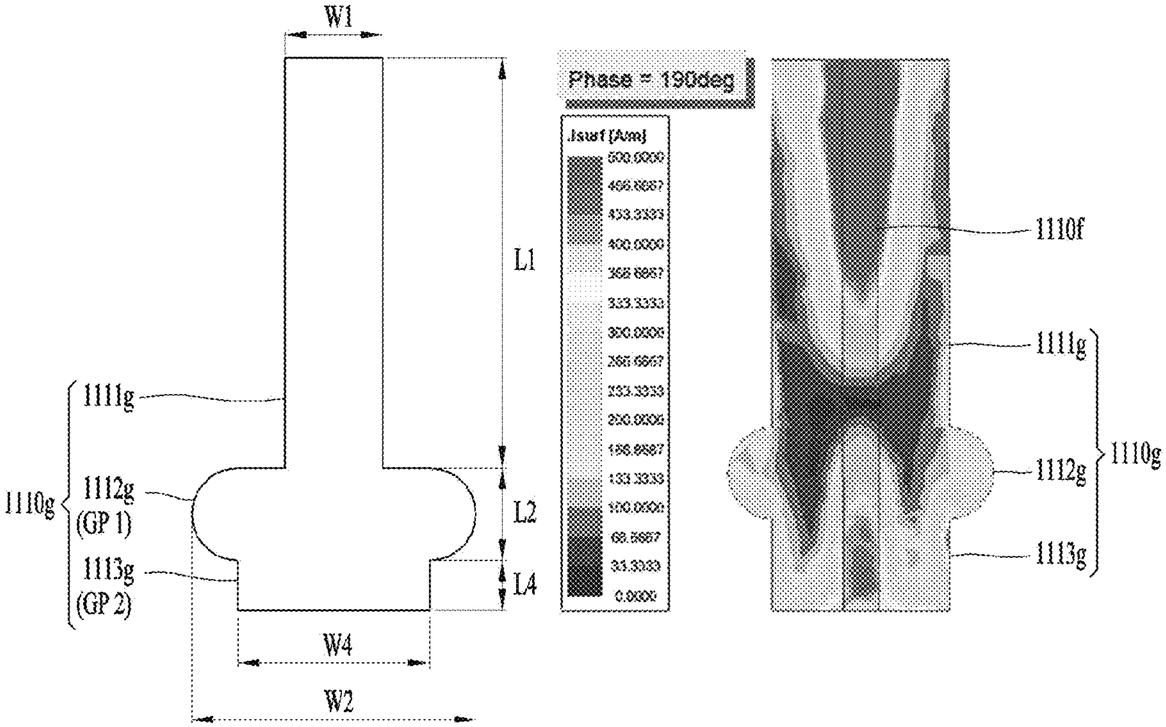
FIG. 15A illustrates a front view and a current distribution with respect to a second conductive pattern of FIG. 14B.
Figure 15B:
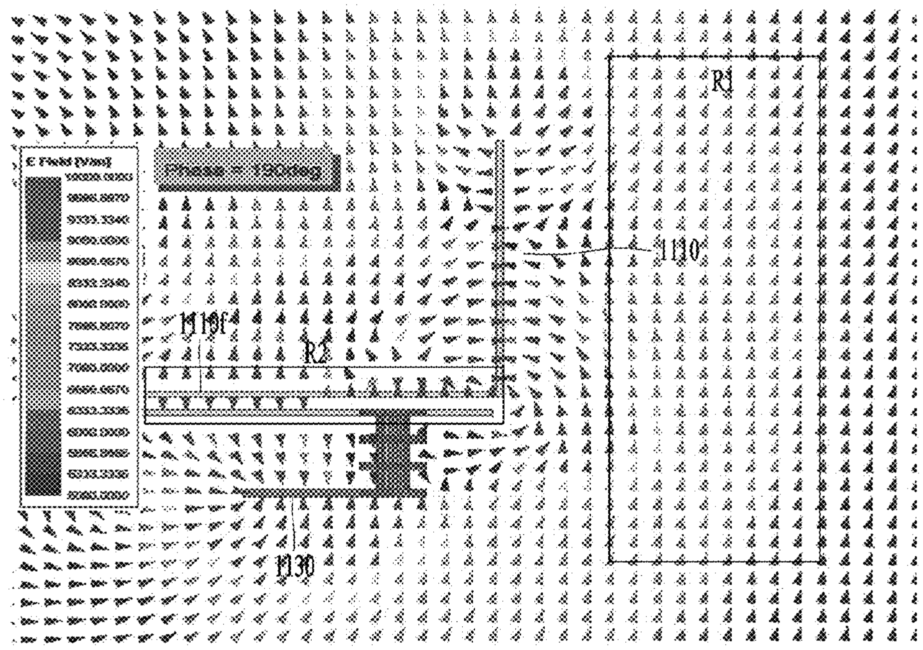
FIG. 15B illustrates an electric field distribution of a structure of the vertically polarized antenna of FIG. 14B.

Meanwhile, a via structure of a lower-end pole of a vertically polarized antenna according to this specification may be arranged in a further inner region of the PCB to ensure stability in a process. In this regard, FIGS. 14A and 14B illustrate via structures such that lower-end poles of vertically polarized antennas according to this specification are arranged at different locations on a PCB. FIG. 15A illustrates a front view and a current distribution with respect to a second conductive pattern of FIG. 14B. FIG. 15B illustrates an electric field distribution of a structure of the vertically polarized antenna of FIG. 14B.

In FIG. 14A, in a lower-end pole structure having an inverted C shape, an end portion of the second conductive pattern 1110*g* and an end portion of the third conductive pattern 1130 are arranged at a same point in one side end portion of the PCB 1100*b*. As end portions of via pads of the via structure 1100*v* are placed to one side end portion of the PCB 1100*b*, a metal pattern is exposed to outside. When the via pads are placed in an outermost region of a dielectric of the PCB 1100*b* as shown in FIG. 14A, there is such a possibility that a metal pattern such as copper may be exposed to outside of the PCB 1100*b* and become oxidized.

In a structure of a lower-end pole of an inverted C-shape, a via structure 1100*v* of FIG. 14B is arranged further inwardly compared to the via structure 1100*v* of FIG. 14A. According to the via structure 1100*v* of FIG. 14B, the second conductive pattern 1110*g* may be configured to include the first sub-pattern 1111*g*, the second sub-pattern 1112*g*, and a third sub-pattern 1113*g* as shown in FIG. 15. The second sub-pattern 1112*g* and the third sub-pattern 1113*g* may be referred to as a first ground pad GP1 and a second ground pad GP2, respectively. Alternatively, the second sub-pattern 1112_g_ and the third sub-pattern 1113_g_ may be referred to as a first expansion pad and a second expansion pad, respectively.

Referring to FIG. 14B and (a) of FIG. 15A, the second conductive pattern 1110_g_ may further include the third sub-pattern 1113_g_ which is a via pad extending outwardly compared to the via structure 1100_v_. Therefore, when the via pad is placed inside a dielectric in the form of a prepreg, power may be easily fed to an antenna using the third sub-pattern 1113_g_, which is an extension pad, to maintain a role of ground for a feeding line.

(b) of FIG. 15 illustrates a current distribution diagram when a signal of the 60 GHz band is transmitted from the first sub-pattern 1111_g_, which is feed ground, and the third sub-pattern 1113_g_, which is the second expansion pad. Through strong and fine current intensity distribution along the feeding line 1110_f_ which is a central region of the first sub-pattern 1111_g_, it may be checked that current flows well.

Referring to FIGS. 15A and 15B, an electric field distribution is generated at a critical level or higher in a first region R1 in which the feeding line 1110_f_ is arranged and a second region R2 which is a radiation region in which a vertically polarized antenna is arranged. When it is indicated that a signal is well transmitted to the antenna in the first region R1 in which the feeding line 1110_f_ is arranged, it may be understood that an electric field is strongly generated upwards and downwards in the first region R1. It may be checked that in the second region R2 which is the radiation region, an electric field is well generated in an upward-and-downward direction, and thus, radiation is conducted in a state in which vertical polarization is well established. In the second region R2 which is a radiating region, the first conductive pattern 1110 which is an upper-end pole and the third conductive pattern 1130 which is a lower-end pole operate as vertically polarized antennas.

Referring to FIGS. 7A to 15B, a shape of the second conductive pattern 1110_g_ of the PCB 1100_b_ may be arranged to correspond to a shape of at least one of the conductive pads 1131_p_ and 1132_p_. According to an embodiment of this specification, the second conductive pattern 1110_g_ may extend as the via structure 1100_v_ is moved into an inner region of the PCB 1100_b_.

As described above, the second conductive pattern 1110_g_ may further include the third sub-pattern 1113_g_ in addition to the first sub-pattern 1111_a_ and the second sub-pattern 1112_g_. The third sub-pattern 1113_g_ may be arranged at an end portion of the second sub-pattern 1112_g_ to have a fourth width W4 in a first axial direction and a fourth length LA in a second axial direction. The second sub-pattern 1112_g_ may constitute a first ground pad GP1 connected to a plurality of via holes in the first axial direction. The third sub-pattern 1113_g_ may constitute a second ground pad GP2 extending from an end portion of the first ground pad GP1. A signal transmitted through the feeding line 1110_f_ may be transmitted to the first conductive pattern 1110 by the second ground pad GP2 extended from the first ground pad GP1.

Figure 16A:
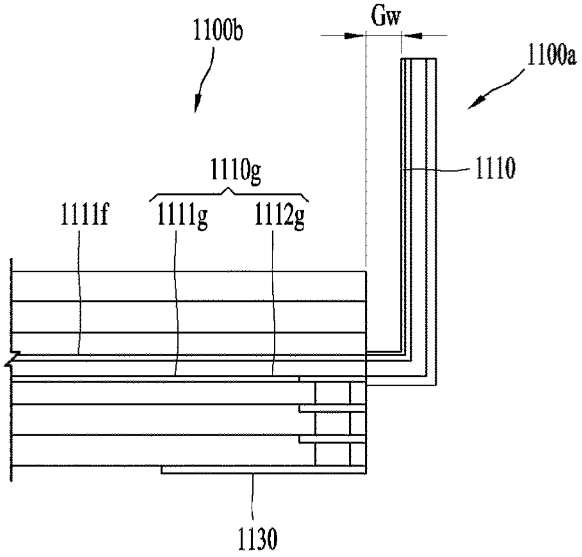
FIG. 16A illustrates a structure in which an FPCB is vertically coupled to a PCB according to this specification to be spaced apart by a predetermined gap space.
Figure 16B:
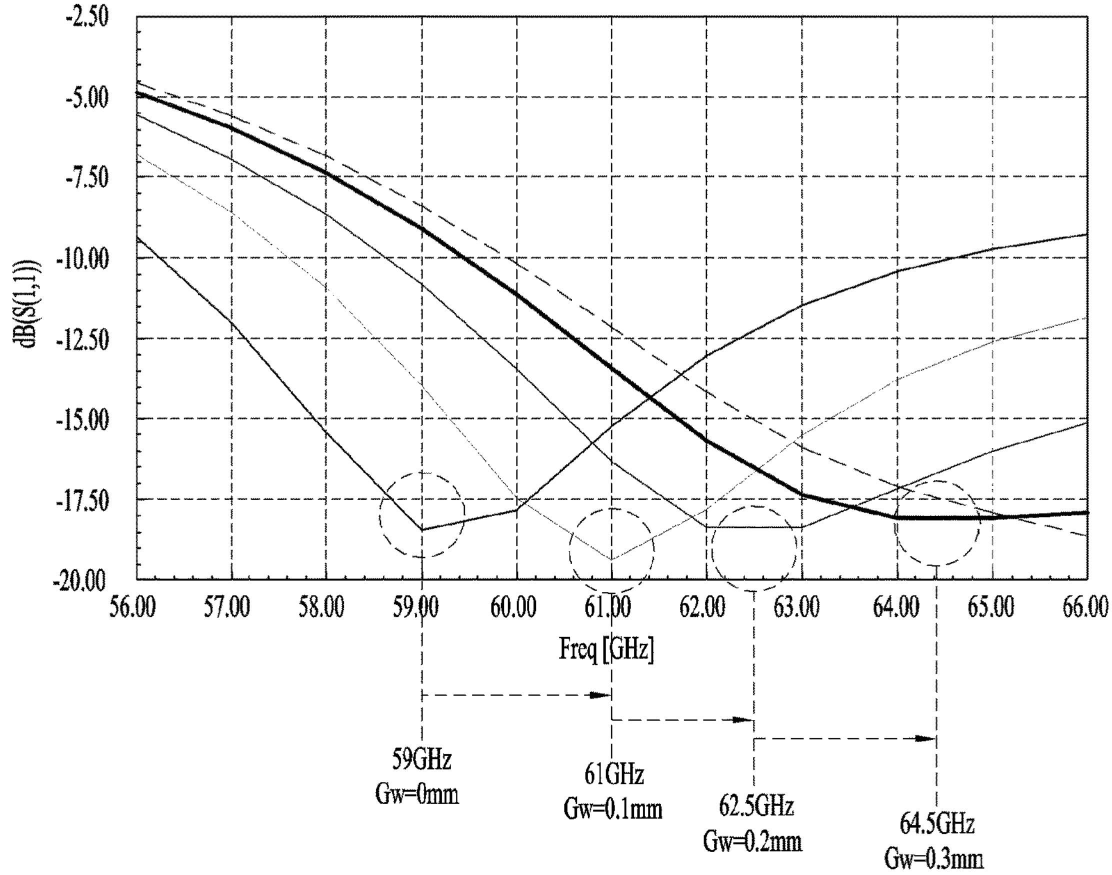
FIG. 16B shows a comparison of reflection coefficient characteristics according to a gap space between the FPCB and the PCB each shown in FIG. 16A.

Meanwhile, the FPCB 1100_a_ constituting the antenna module according to this specification may be arranged to be vertical to the PCB 1100_b_ in a state of being coupled to the feeding line 1110_f_ arranged at an end portion of the PCB 1100_b_. In this regard, FIG. 16A illustrates a structure in which an FPCB is vertically coupled to a PCB according to this specification to be spaced apart by a predetermined gap space. FIG. 16B shows a comparison of reflection coefficient characteristics according to a gap space between the FPCB and the PCB each shown in FIG. 16A.

Referring to FIGS. 16A and 16B, changes in antenna performance with respect to changes in a space in a gap Gw between the PCB 1100_b_ and the FPCB 1100_a_ are shown. This may be used to determine an operating frequency of an antenna by adjusting the space in the gap Gw. When the FPCB 1100_a_ is arranged vertically toward an upward direction, the FPCB 1100_a_ cannot be practically arranged perpendicularly such that a space in a gap physically becomes 0 mm. Accordingly, a space in a gap Gw at a critical level or greater may be caused, and when the space in the gap Gw is increased, an operating frequency of an antenna may shift upward.

FIG. 16B shows changes in reflection coefficients S11 according to a change in a space in a gap Gw of a vertically polarized dipole antenna implemented on the FPCB 1100_a_. It may be understood that as the space in the gap Gw increases from 0 mm, 0.1 mm, 0.2 mm, to 0.3 mm by 0.1 mm, a resonant frequency increases sequentially from 59 GHz to 64.5 GHz.

Referring to FIGS. 7A to 16B, one side end portion of the PCB 1100_b_ may be arranged to be spaced apart from the FPCB 1100_a_ made of a flexible material by the gap Gw having a predetermined width. The width of the gap Gw between the one side end portion of the PCB 1100_b_ and the FPCB 1100_a_ arranged vertically thereto may be configured to be 0.3 mm or less.

The vertically polarized antenna V-ANT according to this specification may be configured as a vertically polarized dipole antenna structure by using the FPCB 1100_a_ arranged vertically to an end portion of one side of the PCB 11100_b_. In this regard, one pole may be arranged on one layer of the FPCB 1100_a_, and another pole may be arranged on the PCB. An electric field having vertical polarization due to upper and lower-end poles may be generated to operate as a vertically polarized antenna. The lower-end pole may be arranged to have an inverted C-shaped structure for antenna miniaturization and a width thereof may be increased through the via structure 1100_v_. Accordingly, an antenna impedance and an operating frequency may be shifted downward, thereby implementing miniaturization of an antenna structure.

Figure 17A:
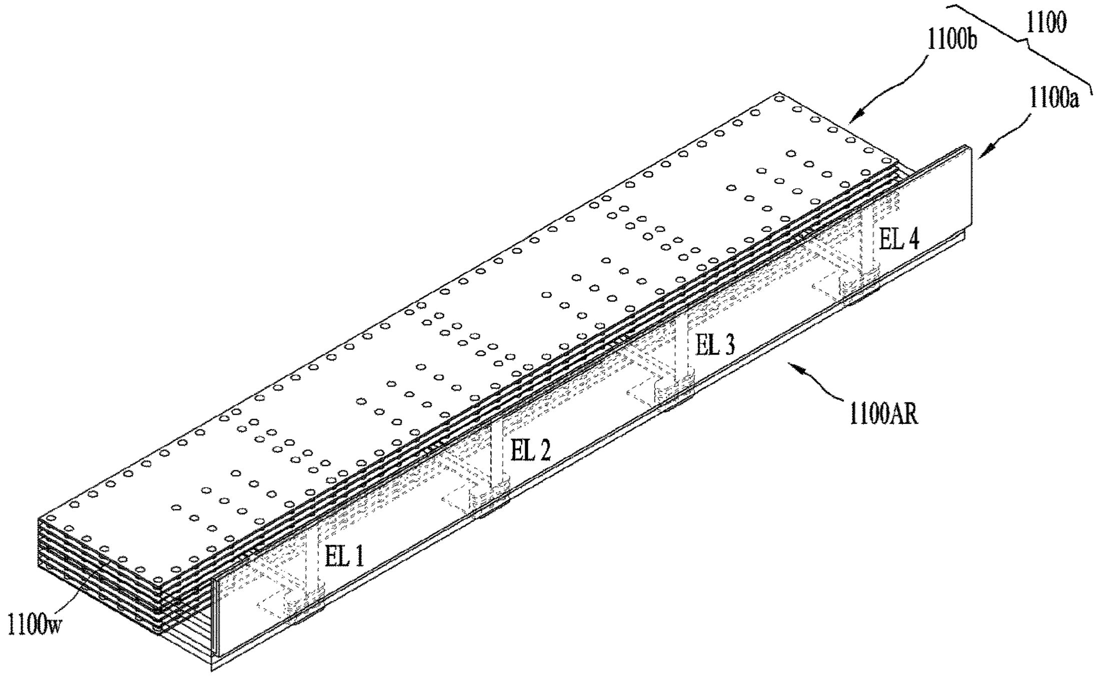
FIG. 17A illustrates an antenna module implemented as a vertically polarized array antenna according to an embodiment.
Figure 17B:
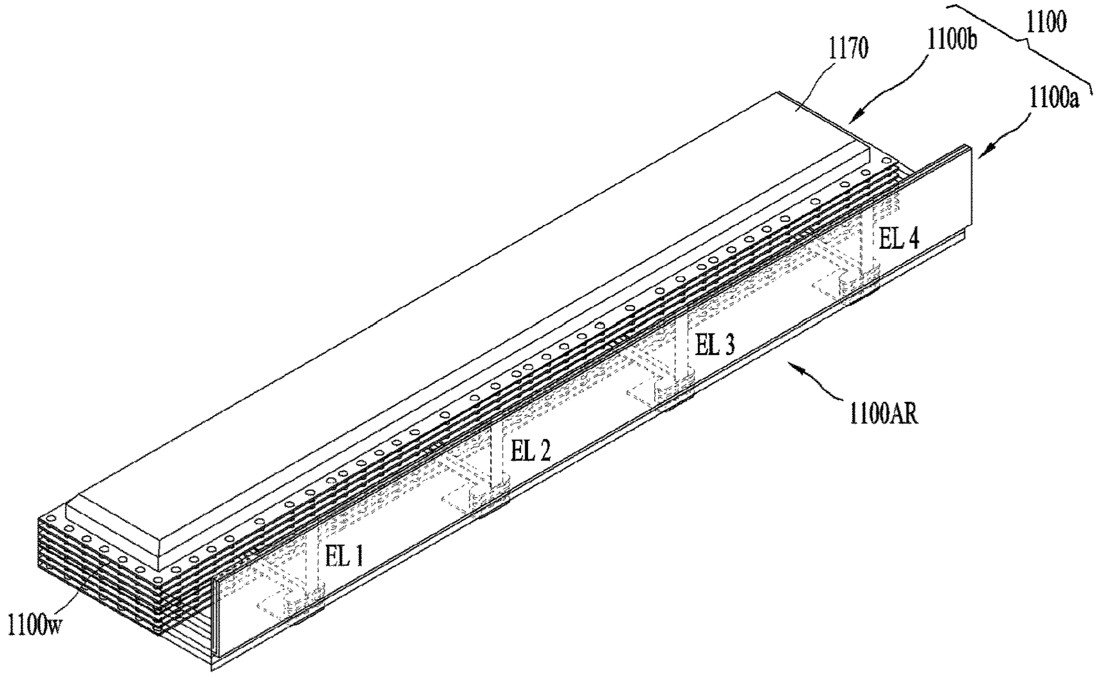
FIG. 17B illustrates a structure in which a shield can is arranged on top of a PCB of the antenna module of FIG. 17A.
Figure 18A:
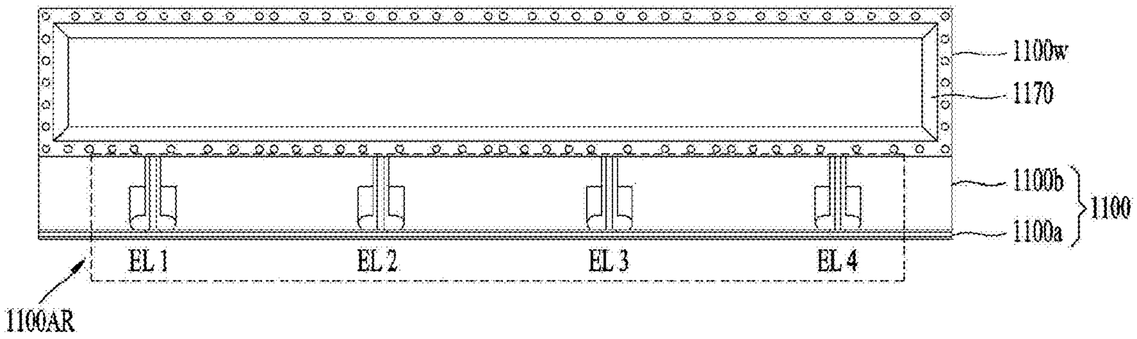
FIG. 18A is a front view of an array antenna module in which the shield can of FIG. 17B is arranged.
Figure 18B:
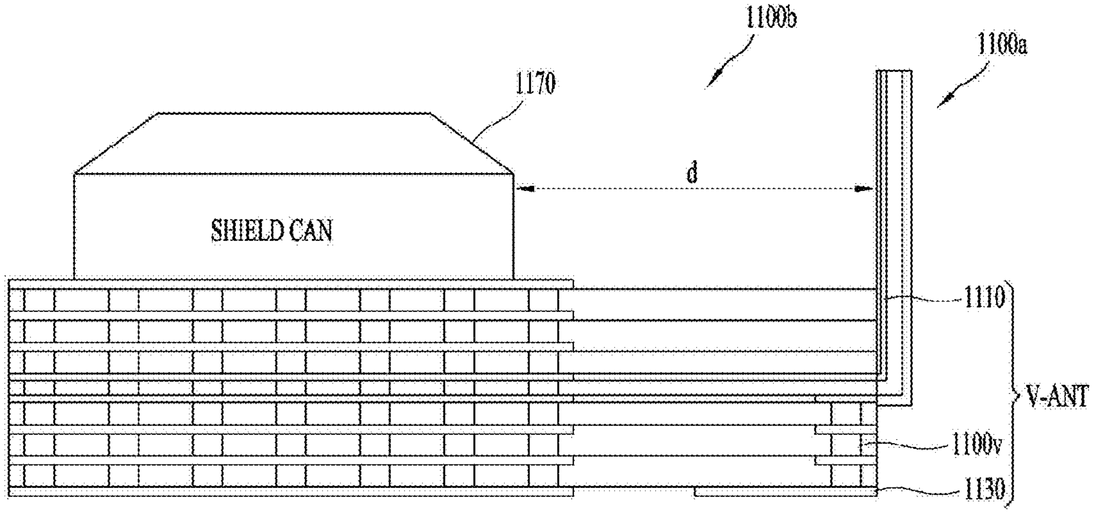
FIG. 18B is a side view of the array antenna module in which the shield can of FIG. 18A is arranged.
Figure 18C:
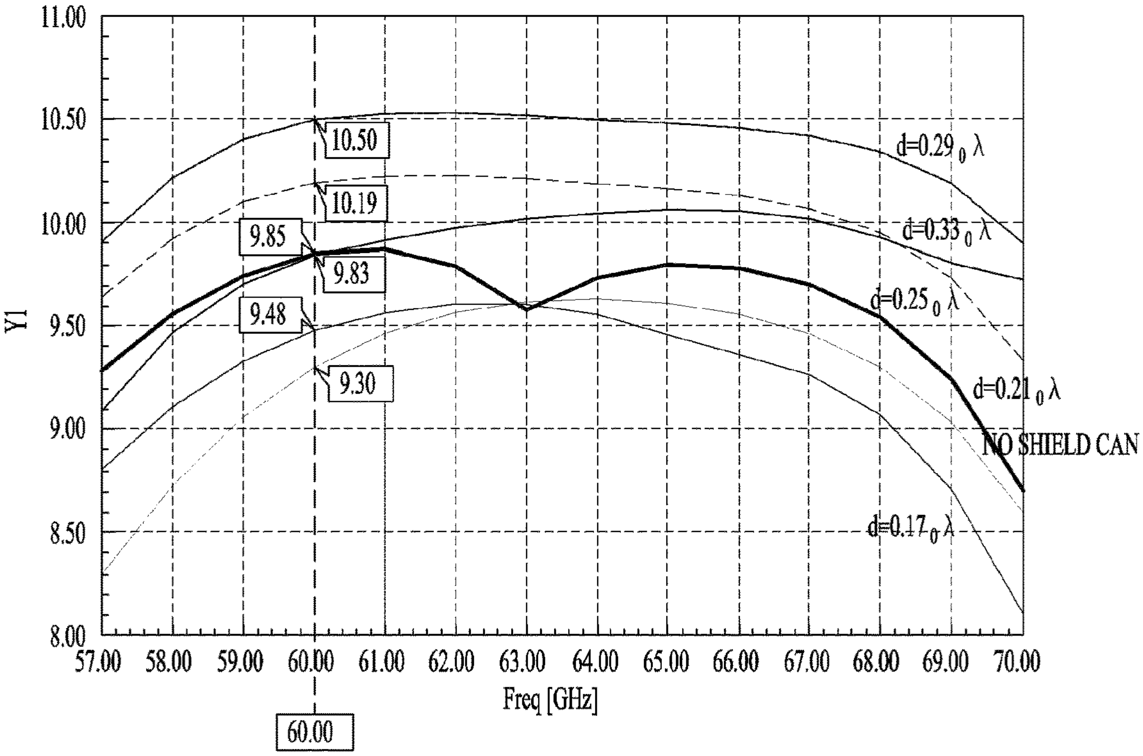
FIG. 18C shows a change in a gain of the array antenna according to a change in a distance from the shield can of FIGS. 17B to 18B to a vertically polarized antenna.

Meanwhile, an antenna module implemented as a vertically polarized antenna according to this specification may be implemented as an array antenna. In this regard, FIG. 17A illustrates an antenna module implemented as a vertically polarized array antenna according to an embodiment. FIG. 17B illustrates a structure in which a shield can is arranged on top of a PCB of the antenna module of FIG. 17A. FIG. 18A is a front view of an array antenna module in which the shield can of FIG. 17B is arranged. FIG. 18B is a side view of the array antenna module in which the shield can of FIG. 18A is arranged. FIG. 18C shows a change in a gain of the array antenna according to a change in a distance from the shield can of FIGS. 17B to 18B to a vertically polarized antenna.

Referring to FIGS. 17A to 18B, a shield can 1170 may be placed on an upper portion of the PCB 1100_b_ on which a 1×4 end-fire array antenna is implemented. The shield can 1170 may be implemented as a metal case, but is not limited thereto. An array antenna gain may be improved using components mounted on the PCB 1110_b_ on which a vertically polarized end-fire array antenna is arranged.

For example, when it is assumed that a component mounted on the PCB 1110_b_ is the shield can 1170, the shield can 1170 may be arranged on the upper portion of the PCB 1110*b*. The shield can 1170 may be attached to the ground wall 1100*w* of the PCB 1100*b*, and the vertically polarized end-fire array antenna may be arranged in a front portion of the shield can 1170. An antenna gain of the array antenna varies depending on a distance d between the shield can 1170 and the antenna. Here, d may be defined as a distance from the shield can 1170 to the first conductive pattern 1100 of the vertically polarized antenna arranged on the FPCB.

Referring to FIGS. 7B and 7C, the first conductive pattern 1110, the second conductive pattern 1110*g*, the via structure 1100*v*, and the third conductive pattern 1130 may operate as antenna elements having vertical polarization in a mmWave frequency band. Referring to FIGS. 7B, 7C, and 17A to 18B, a plurality of antenna elements may be arranged in a first axial direction to constitute an array antenna 1100AR. The array antenna 1100AR may be also configured to include a first array antenna EL1 to a fourth array antenna ELA. The first antenna element EL1 to the fourth antenna element ELA of the array antenna 1100AR may be configured to radiate a beamformed radio signal in the first axial direction.

Referring to FIGS. 17B to 18C, a gain of a 1×4 array antenna may be changed depending on a change in the distance d between the shield can 1170 and the vertically polarized antenna V-ANT in a frequency band of 57 to 70 GHz. (i) When only a 1×4 array antenna is arranged without a shield can, a gain value of 9.3 dBi is obtained at 60 GHz. (ii) As a distance d is changed from $0.17\lambda_0$ to $0.29\lambda_0$, an array antenna gain at 60 GHz is increased from 9.48 dB to 10.5 dB. Meanwhile, in a structure having a distance d of $0.33\lambda_0$, an array antenna gain is maintained up to 10.19 dB at 60 GHz. When a whole frequency band from 57 to 70 GHz is taken into account, it may be understood that the vertically polarized antenna V-ANT has a greater antenna gain than that of a structure in which a shield can is not present, except for a frequency band of 60 GHz or higher when $d=0.17\lambda_0$.

Accordingly, the antenna module 1100 implemented as the vertically polarized antenna V-ANT according to this specification may include the shield can 1170 arranged on a ground pattern on an upper portion of the ground wall 1100*w* of the PCB 1100*b*. The distance d between the shield can 1170 and the first conductive pattern 1110 arranged on the FPCB 1100*a* may be configured to be in a range of $(0.17+n)*\lambda_0<d<(0.33+n)*\lambda_0$. Here, n may be 0 or a natural number.

Figure 19:
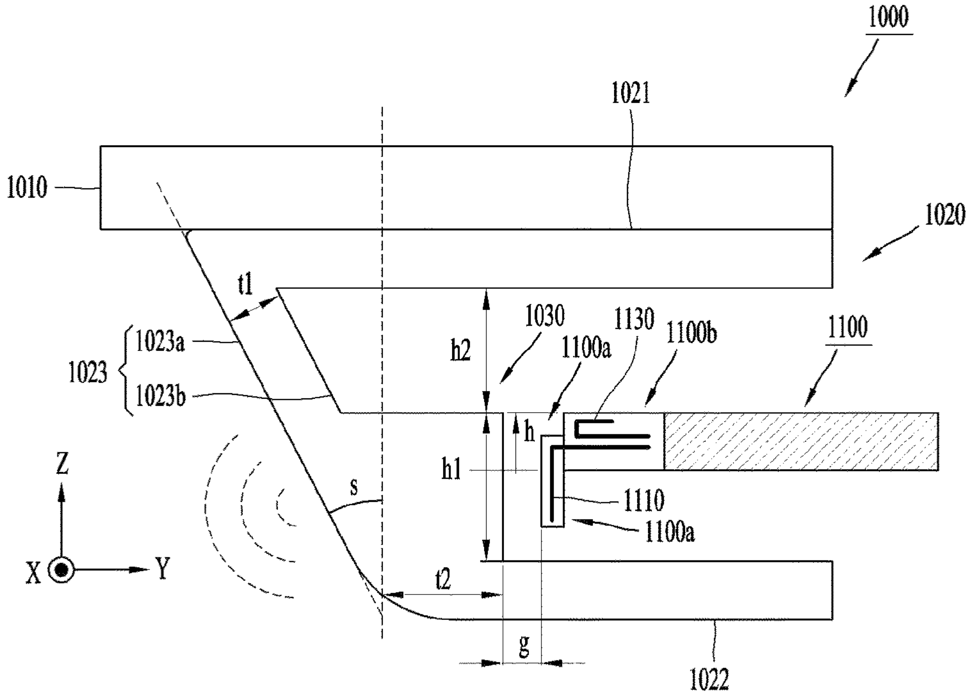
FIG. 19 illustrates an electronic device having an antenna module arranged in a dielectric case according to this specification.

The antenna module implemented as the vertically polarized antenna according to one aspect of this specification has been described above. Hereinafter, an electronic device having an antenna module implemented as a vertically polarized antenna according to another aspect of this specification is to be described. In this regard, all the technical features and configurations described above also apply to a description to be provided hereinafter. FIG. 19 illustrates an electronic device having an antenna module arranged in a dielectric case according to this specification.

Referring to FIG. 19, an antenna module 1000 may be placed inside a mechanical structure such as a dielectric case 1020 of a metal frame 1010 of the electronic device having a display. In this regard, a rear surface of the PCB 1100*b* of the antenna module 1000 may be placed to face the metal frame 1010 so that a rear surface of the antenna module 1000 is directed toward the metal frame 1010.

As shown in the current distribution diagram of the first conductive pattern 1110 which is the upper-end pole and the third conductive pattern 1130 which is the lower-end pole each shown in FIG. 15B, it may be checked that an intensity of an electric field is generated more strongly and further in a vertical direction toward which the upper-end pole is arranged. Accordingly, referring to FIGS. 15B and 19, to minimize an interference of the metal frame 1010, it is advantageous for the first conductive pattern 1110 which is an upper-end pole to be directed toward an opposite direction to the metal frame 1010, that is, toward a lower end. Accordingly, the third conductive pattern 1130, which is an inverted C-shaped lower-end pole, may be placed to be adjacent to the metal frame 1010.

Referring to FIGS. 1 to 19, the electronic device 1000 may be configured to include the metal frame 1010, the dielectric case 1020, and the antenna module 1100. The metal frame 1010 may be configured to constitute a side surface region of the electronic device 1000. The metal frame 1010 may be arranged to surround the display and configured to support the display. The dielectric case 1020 may be located on one side of the metal frame 1010. The dielectric case 1020 may be arranged on one side surface constituting a lower region of the metal frame 1010. The dielectric case 1020 may be arranged to be inclined at a predetermined angle s. An air layer 1030 may be arranged inside the dielectric case 1020.

The antenna module 1100 may be arranged in an inner region of the dielectric case 1020. The antenna module 1100 may be arranged to face an inner surface 1023 of the dielectric case 1020. The dielectric case 1020 may include a front surface portion 1021 attached to the metal frame 1020, a rear surface portion 1022 corresponding to the front surface portion 1021, and a side surface portion 1023 arranged between the front surface portion 1021 and the rear surface portion 1022. A side surface portion 1023 may be configured to include an inner surface 1023 and an outer surface 1023. A wireless signal radiated from the antenna module 1000 may radiate a wireless signal to a side surface of the dielectric case 1020 through the inner surface 1023 and the outer surface 1023.

The antenna module 1000 may be constituted by the multi-layer substrates (multi-layered substrates) 1100*a* and 1100*b* made of a plurality of dielectric materials, and conductive patterns. The FPCB 1100*a* and the PCB 1100*b* may be implemented as the multi-layer substrates (multi-layered substrates). The multi-layer substrates 1100*a* and 1100*b* may be configured to include the first layer 1110*b*, the second layers 1120*b*, and the third layers 1130*b*.

The first layer 1110*b* may be made of a flexible first material. The second layers 1120*b* may include a plurality of layers made of a stiff (rigid) second material arranged on one side surface of the first layer 1110*b*. The third layers 1130*b* may include a plurality of layers made of the rigid second material arranged on another side surface of the first layer 1110*b*.

The first layer 1110*b* may include the first region R1 arranged in parallel with the second layers 1120*b* and the third layers 1130*b* and the second region R2 arranged vertically to the second layers 1120*b* and the third layers 1130*b*. The first region R1 may be a PCB region and the second region R2 may be an FPCB region.

The conductive patterns may be configured to include the first conductive pattern 1110, the second conductive pattern 1110*g*, and the third conductive pattern 1130. The first conductive pattern 1110 may be arranged on one side surface in the first region R1 and the second region R1 of one side surface of the first layer 1110*a* and configured to transmit and/or receive a signal. The second conductive pattern 1110*g* may be arranged on a lower third layer Lb3 which is one layer among the third layers 1130*b*. The third conductive pattern 1130 may be arranged on a lower fourth layer Lb4 which is another layer among the third layers.

The second conductive pattern 1110*g* and the third conductive pattern 1130 may be connected to each other through via holes. The via holes may be configured as the via structure 1100*v* in which adjacent layers of conductive pads are vertically connected to each other. The lower third layer Lb3 may be arranged to be closer to another side surface of the first layer 1110*b* compared to the lower fourth layer Lb3. The lower fourth layer Lb4 may be placed further apart from the another side surface of the first layer 1110*b* compared to the lower third layer Lb3.

A space W1*v* of the first conductive pattern 1110 arranged in the first region R1 may be configured to be narrower than each of spaces W1 and W2 in the second conductive pattern 1110*g* connected to ground of the multi-layer substrate. The second conductive pattern 1110*g* may be constituted by the first sub-pattern 1111*g* connected to one region on the ground of the multi-layer substrate and the second sub-pattern 1112*g* connected to the via holes. A space W1 in the first sub-pattern 1111*g* of the second conductive pattern 1110*g* may be configured to be narrower than a space in the second sub-pattern 1112*g* arranged on the lower fourth layer Lb4 among the third layers.

A length L3 of the third conductive pattern 1130 may be configured to be shorter than a length of the first sub-pattern 1111*g* of the second conductive pattern 1110*g*. An end region of the third conductive pattern 1130 may be arranged to be electrically connected to the second sub-pattern 1112*g* through a plurality of rows 1121*v* to 1123*v* of a plurality of via holes. In this regard, the plurality of via holes arranged in the plurality of rows may be configured to include first via holes 1121*v*, second via holes 1122*v*, and third via holes 1123*v*.

Figure 20A:
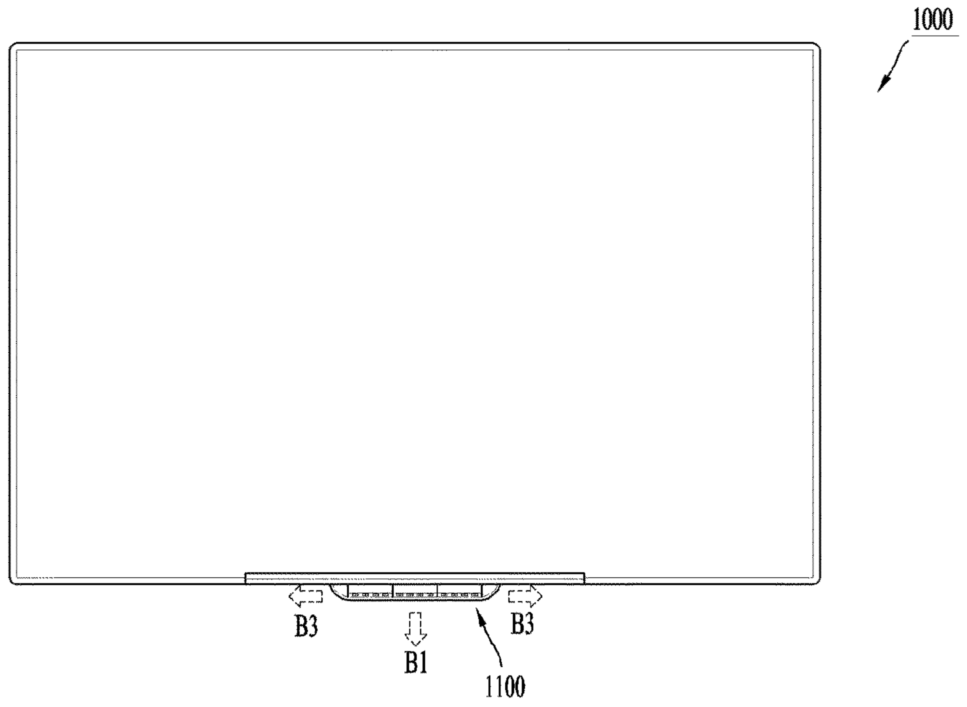
FIG. 20A illustrates a structure in which an antenna module constituted by a plurality of array antennas is arranged in an electronic device.
Figure 20B:
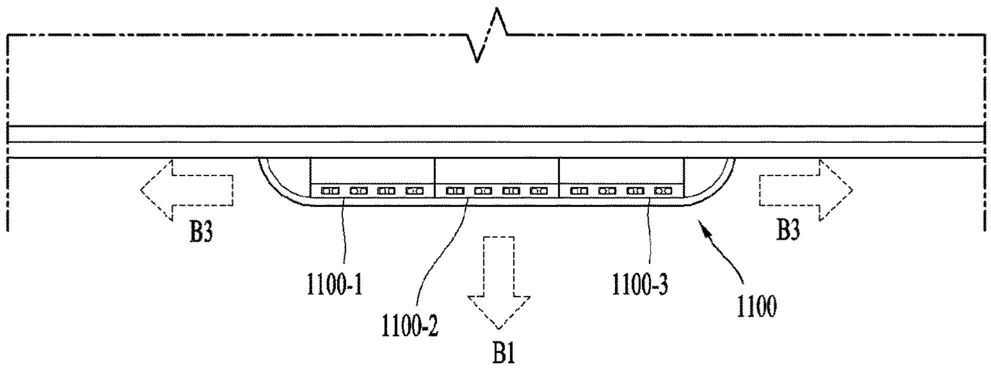
FIG. 20B is an enlarged view of a plurality of array antenna modules of FIG. 20A.

The antenna module implemented as the vertically polarized antenna disclosed herein may be configured as an array antenna in an electronic device. In this regard, FIG. 20A illustrates a structure in which an antenna module constituted by a plurality of array antennas is arranged in an electronic device. FIG. 20B is an enlarged view of a plurality of array antenna modules of FIG. 20A.

Referring to FIGS. 1 to 20B, an array antenna may include the first antenna module 1100-1 and the second antenna module 1100-2 arranged apart from the first antenna module 1100-1 by a predetermined gap in a first horizontal direction. Meanwhile, antenna modules are not limited to two antenna modules. Three or more antenna modules may be implemented as illustrated in FIG. 20B. Accordingly, the antenna modules may be configured to include first to third antenna modules 1100-1 to 1100-3.

The processor 1400 of FIGS. 5 to 6C may control to generate a first beam and a second beam in a first direction and a second direction using the first and second antenna modules 1100-1 and 1100-2, respectively. That is, the first beam may be generated from a horizontal direction toward the first direction using the first antenna module 1100-1. In addition, the second beam may be generated from a horizontal direction toward the second direction using the second antenna module 1100-2. In relation to this, the processor 1400 may perform MIMO using the first beam in the first direction and the second beam in the second direction.

The processor 1400 may generate a third beam in a third direction using the first and second antenna modules 1100-1 and 1100-2. In relation to this, the processor 1400 may control the transceiver circuit 1250 to synthesize signals received through the first and second antenna modules 1100-1 and 1100-2. Also, the processor 1400 may control signals transmitted to the first and second antenna modules 1100-1 and 1100-2 through the transceiver circuit 1250 to be distributed to each antenna element. The processor 1400 may perform beamforming using the third beam having a beam width smaller than each of beam widths of the first beam and the second beam.

Meanwhile, the processor 1400 may perform MIMO using the first beam in the first direction and the second beam in the second direction, and perform beamforming using the third beam having a beam width smaller than each of beam widths of the first and second beams. In relation to this, when quality of a first signal and a second signal received from another electronic device in a periphery of the electronic device is equal to or less than a threshold, beamforming may be performed using the third beam.

A number of elements of the array antenna is not limited to two, three, four, or the like as illustrated in the drawing. For example, the number of the elements of the array antenna may extend to 2, 4, 8, 16, or the like. Accordingly, the array antenna may be configured as a 1×2, 1×3, 1×4, 1×5, . . . , 1×8 array antenna.

Figure 21:
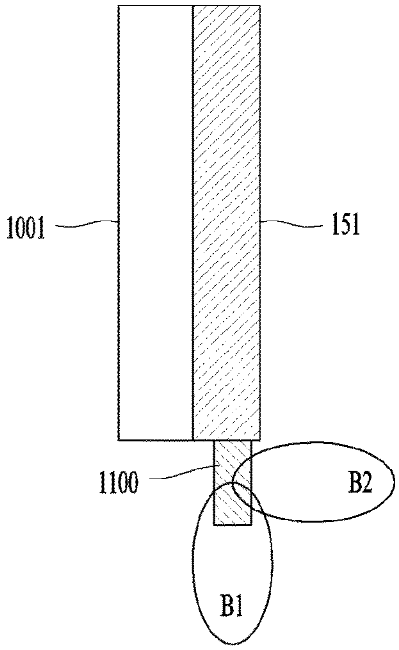
FIG. 21 illustrates an antenna module combined in varying combination structures at a particular position in an electronic device according to embodiments.
Figure 21:
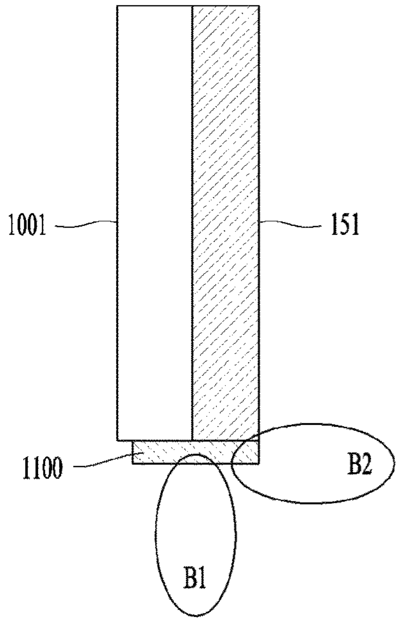
Figure 21:
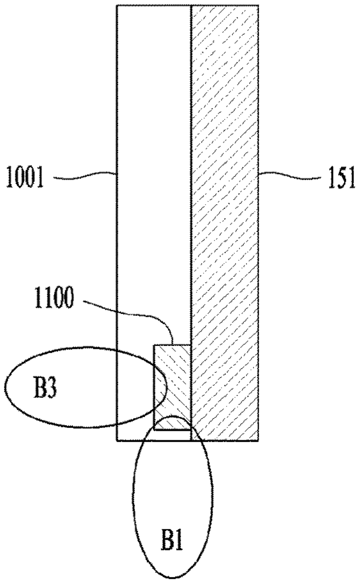

Meanwhile, FIG. 21 illustrates an antenna module combined in varying combination structures at a particular position in an electronic device according to embodiments. Referring to (a) of FIG. 21, the antenna module 1100 may be arranged on a lower region of the display 151 to be substantially horizontal to the display 151. Accordingly, a beam B1 may be generated in a lower direction of the electronic device through one array antenna among a plurality of array antenna modules. Meanwhile, another beam B2 may be generated in a front direction of the electronic device through another array antenna among the plurality of array antenna modules.

Referring to (b) of FIG. 21, the array antenna module 1100 may be arranged on a lower region of the display 151 to be substantially vertical to the display 151. Accordingly, a beam B2 may be generated in a front direction of the electronic device through one array antenna among the plurality of array antenna modules. Meanwhile, another beam B1 may be generated in a lower direction of the electronic device through another array antenna among the plurality of array antenna modules.

Referring to (c) of FIG. 21, the antenna module 1100 may be arranged in a rear case 1001 corresponding to a mechanical structure. The antenna module 1100 may be arranged in the rear case 1001 to be substantially in parallel with the display 151. Accordingly, a beam B1 may be generated in a lower direction of the electronic device through one array antenna among a plurality of array antenna modules. Meanwhile, another beam B3 may be generated in a rear direction of the electronic device through another array antenna among the plurality of array antenna modules.

The antenna module implemented as a vertically polarized antenna, and the electronic device including the antenna module have been described above. Hereinafter, technical effects of the antenna module implemented as a vertically polarized antenna according to this specification and the electronic device including the antenna module are described.

According to an embodiment, an antenna module in which a vertically polarized antenna operating in a millimeter wave band is implemented, and an electronic device including the antenna module may be provided.

According to an embodiment, an antenna may be implemented on one side of a PCB to perform radiation through a conductive pattern of an FPCB and a via structure and a conductive pattern implemented on one side of the PCB.

According to an embodiment, a vertically polarized antenna may be provided through an asymmetrical dipole antenna constituted by an upper-end pole and a lower-end pole arranged on an FPCB and a PCB, respectively.

According to an embodiment, vertical polarization may be implemented even at a height of a PCB which is insufficient to implement the vertical polarization by arranging an FPCB vertically to the PCB and through a conductive pattern of the FPCB and a conductive pattern and a vertical via of the PCB.

According to an embodiment, radiation performance may be enhanced by increasing an area by implementing one pole on an FPCB and another pole on a PCB as radiators to thereby improve performance of vertical polarization.

According to an embodiment, wireless communication may be performed with a peripheral electronic device by optimally arranging an antenna module on a lower portion of an electronic device.

Further scope of applicability of this specification will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art. In relation to this specification described above, designing and driving of an antenna operating in a mmWave band and an electronic device controlling the antenna may be implemented as computer-readable codes on a medium having a program recorded thereon.

The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the control unit of the terminal. Therefore, it should also be understood that the above-described embodiments are not limited by any of the details of the foregoing description, unless otherwise specified, but rather should be construed broadly within its scope as defined in the appended claims, The scope of this specification should be determined by reasonable interpretation of the appended claims, and all changes within the scope of equivalents of this specification are included in the scope of this specification.

The invention claimed is:

1. An antenna module comprising a multi-layer substrate made of a plurality of dielectrics and a conductive pattern, the multi-layer substrate comprising:

a first layer made of a flexible first material;

second layers comprising a plurality of layers made of a stiff (rigid) second material arranged on one side surface of the first layer; and third layers comprising a plurality of layers made of the rigid second material arranged on another side surface of the first layer, wherein the first layer comprises a first region arranged in parallel with the second layers and the third layers, and a second region arranged to be vertical to the second layers and the third layers, and wherein the conductive pattern comprises:

a first conductive pattern arranged on the one side surface in the first region and the second region of the one side surface of the first layer to transmit and receive a signal;

a second conductive pattern arranged on a lower third layer which is one layer of the third layers; and a third conductive pattern arranged on a lower fourth layer which is another layer among the third layers, and wherein the second conductive pattern and the third conductive pattern are connected to each other through via holes, and the lower third layer is arranged close to the another side surface of the first layer, and the lower fourth layer is arranged further apart from the another side surface of the first layer compared to the lower third layer.

2. The antenna module of claim 1, wherein a space in the first conductive pattern arranged in the first region is narrower than a space in the second conductive pattern connected to ground of the multi-layer substrate.

3. The antenna module of claim 1, wherein the second conductive pattern comprises a first sub-pattern connected to one region of the ground of the multi-layer substrate and a second sub-pattern connected to the via holes, and a space in the first sub-pattern, which is a part of the second conductive pattern, is narrower than a space in the second sub-pattern arranged in the lower fourth layer among the third layers.

4. The antenna module of claim 3, wherein a length of the third conductive pattern is shorter than a length of the first sub-pattern of the second conductive pattern.

5. The antenna module of claim 3, wherein one end region of the third conductive pattern is configured to be electrically connected to the second sub-pattern through a plurality of rows of a plurality of the via holes.

6. The antenna module of claim 3, wherein a first height of the first conductive pattern is configured to be within a predetermined range with reference to 1 mm, and a second height of a via structure between the third conductive pattern and the second conductive pattern each connected to the via structure constituted by the via holes is configured to be within a predetermined range with reference to 0.3 mm.

7. The antenna module of claim 6, wherein the first height of the first conductive pattern is configured to be greater than the second height of the via structure by a predetermined height or more, and a difference between the first height and the second height is configured to be within a predetermined range with reference to $0.14\lambda_0$ at 60 GHz.

8. The antenna module of claim 7, wherein a third width of the third sub-pattern is configured to be within a range between 0.2 mm and 1.0 mm.

9. The antenna module of claim 8, wherein the third conductive pattern is configured to have the third width in a first axial direction and a third length in a second axial direction vertical to the first axial direction, the third width of the third conductive pattern is configured to be identical to a second width of the second sub-pattern, and the third conductive pattern is configured to have the third length from one side end portion to another side end portion.

10. The antenna module of claim 9, wherein the third conductive pattern is connected to the second sub-pattern through the via holes at a point adjacent to the one side end portion of the third conductive pattern, and the another side end portion of the third conductive pattern is located to a point adjacent to an end portion of a ground wall configured as a multilayer structure in an inner region of the multi-layer substrate.

11. The antenna module of claim 10, further comprising at least one conductive pad arranged between the second sub-pattern and the third conductive pattern, wherein the via holes arranged in the first axial direction are configured to be:

arranged vertically in a third axial direction to connect the second sub-pattern to the at least one conductive pad; and arranged vertically in the third axial direction to connect the at least one conductive pad to the third conductive pattern.

12. The antenna module of claim 11, wherein the second conductive pattern further comprises a third sub-pattern arranged at an end portion of the second sub-pattern to have a fourth width in the first axial direction and a fourth length in the second axial direction, the second sub-pattern constitutes a first ground pad connected to a plurality of via holes in the first axial direction, the third sub-pattern constitutes a second ground pad extending from an end portion of the first ground pad, and a signal transmitted through a feeding line of the multi-layer substrate is transmitted to the first conductive pattern by the second ground pad extending from the first ground pad.

13. The antenna module of claim 10, wherein the one side end portion of the multi-layer substrate is arranged to be spaced apart from a flexible substrate made of the flexible material by a gap having a predetermined width, and the width of the gap is configured to be 0.3 mm or less.

14. The antenna module of claim 13, further comprising a shield can arranged on a ground pattern in an upper portion of the ground wall of the multi-layer substrate, wherein a distance d from the shield can to the flexible substrate is configured to be in a range of $(0.17+n)*\lambda_0<d<(0.33+n)*\lambda_0$.

15. The antenna module of claim 6, wherein the first conductive pattern, the second conductive pattern, the via structure, and the third conductive pattern operate as antenna elements having horizontal polarization in a millimeter wave band, the antenna elements are arranged in plurality in a first axial direction to constitute an array antenna, and a first antenna element to a fourth antenna element of the array antenna are configured to radiate a beamformed radio signal in the first axial direction.

16. An electronic device having an antenna module, the electronic device comprising:

a metal frame constituting a side region of the electronic device;

a dielectric case arranged on one side of the metal frame; and an antenna module arranged in an inner region of the dielectric case, arranged to face an inner surface of the dielectric case, and comprising a multi-layer substrate made of a plurality of dielectric materials and a conductive pattern, wherein the multi-layer substrate comprises a first layer made of a flexible first material;

the multi-layer substrate comprises second layers comprising a plurality of layers made of a stiff (rigid) second material arranged on one side surface of the first layer; and the multi-layer substrate comprises third layers comprising a plurality of layers made of the rigid second material arranged on another side surface of the first layer, wherein the first layer comprises a first region arranged in parallel with the second layers and the third layers, and a second region arranged to be vertical to the second layers and the third layers, wherein the conductive pattern comprises:

a first conductive pattern arranged on the one side surface in the first region and the second region of the one side surface of the first layer to transmit and receive a signal;

a second conductive pattern arranged on a lower third layer which is one layer of the third layers; and a third conductive pattern arranged on a lower fourth layer which is another layer among the third layers, and wherein the second conductive pattern and the third conductive pattern are connected to each other through via holes, and the lower third layer is arranged close to the another side surface of the first layer, and the lower fourth layer is arranged further apart from the another side surface of the first layer compared to the lower third layer.

17. The electronic device of claim 16, wherein a space in the first conductive pattern arranged in the first region is narrower than a space in the second conductive pattern connected to ground of the multi-layer substrate.

18. The electronic device of claim 16, wherein the second conductive pattern comprises a first sub-pattern connected to one region of the ground of the multi-layer substrate and a second sub-pattern connected to the via holes, and a space in the first sub-pattern, which is a part of the second conductive pattern, is narrower than a space in the second sub-pattern arranged in the lower fourth layer among the third layers.

19. The electronic device of claim 18, wherein a length of the third conductive pattern is shorter than a length of the first sub-pattern of the second conductive pattern.

20. The electronic device of claim 18, wherein one end region of the third conductive pattern is configured to be electrically connected to the second sub-pattern through a plurality of rows of a plurality of the via holes.

* * * * *